(12) United States Patent
Abe et al.

(10) Patent No.: US 12,116,043 B2
(45) Date of Patent: Oct. 15, 2024

(54) VEHICLE BODY STRUCTURE

(71) Applicant: NIPPON STEEL CORPORATION, Tokyo (JP)

(72) Inventors: Masahiko Abe, Tokyo (JP); Hiroaki Kubota, Tokyo (JP); Daisuke Maeda, Tokyo (JP); Yuri Toda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 526 days.

(21) Appl. No.: 17/431,291

(22) PCT Filed: Mar. 5, 2020

(86) PCT No.: PCT/JP2020/009510
§ 371 (c)(1),
(2) Date: Aug. 16, 2021

(87) PCT Pub. No.: WO2020/179883
PCT Pub. Date: Sep. 10, 2020

(65) Prior Publication Data
US 2022/0135143 A1    May 5, 2022

(30) Foreign Application Priority Data

Mar. 6, 2019 (JP) ................. 2019-040609

(51) Int. Cl.
| | | |
|---|---|---|
| *B62D 29/00* | (2006.01) | |
| *B21D 22/20* | (2006.01) | |
| *B21D 53/88* | (2006.01) | |
| *B62D 21/15* | (2006.01) | |
| *C21D 9/00* | (2006.01) | |

(52) U.S. Cl.
CPC ............. *B62D 29/00* (2013.01); *B21D 22/20* (2013.01); *B21D 53/88* (2013.01); *C21D 9/0068* (2013.01); *B62D 21/15* (2013.01)

(58) Field of Classification Search
USPC ............................. 296/203.01; 293/121, 122
See application file for complete search history.

(56) References Cited

U.S. PATENT DOCUMENTS

| | | | |
|---|---|---|---|
| 8,740,268 B2 * | 6/2014 | Ebara | B60R 19/26 |
| | | | 293/121 |
| 10,773,755 B2 * | 9/2020 | Kubo | B62D 25/00 |
| 11,801,897 B2 * | 10/2023 | Toda | B21D 22/20 |
| 2004/0201256 A1 * | 10/2004 | Caliskan | F16F 7/12 |
| | | | 296/193.06 |
| 2013/0333190 A1 | 12/2013 | Mizumura et al. | |

(Continued)

FOREIGN PATENT DOCUMENTS

WO   WO 2012/118223 A1   9/2012

*Primary Examiner* — Amy R Weisberg
*Assistant Examiner* — Veronica M Shull
(74) *Attorney, Agent, or Firm* — Birch, Stewart, Kolasch & Birch, LLP

(57) ABSTRACT

This vehicle body structure includes a frame member with a first top section, a corner section, a vertical wall section, and a second top section, and a first support section and a second support section provided at the second top section. L/h≤6.7 is satisfied where the h represents a length between an outer surface of the first top section and an outer surface of the second top section, and the L represents a length between the first support section and the second support section.

7 Claims, 18 Drawing Sheets

(56) References Cited

U.S. PATENT DOCUMENTS

2016/0137150 A1\* 5/2016 Garnweidner .......... B60R 19/18
　　　　　　　　　　　　　　　　　　　　　　293/121
2019/0390295 A1\* 12/2019 Nakagawa .............. C23C 30/00

\* cited by examiner

1A

1B

VEHICLE BODY STRUCTURE

TECHNICAL FIELD OF THE INVENTION

The present invention relates to a vehicle body structure.

The present application claims priority based on Japanese Patent Application No. 2019-040609 filed in Japan on Mar. 6, 2019, and the contents thereof are incorporated herein.

BACKGROUND ART

In related art, as a part of vehicle body structure, frame members obtained by processing a metal sheet member to have a certain cross-sectional shape are used. These frame members are required to have a light weight, and have a sufficient load resistance. Therefore, recently, there is a case in which a material having a high strength, such as a high-tensile steel sheet, is used. Meanwhile, in a case that an impact is applied to the vehicle body structure having frame members by collision, the frame member is expected to efficiently absorb the impact by realizing a suitable deformation mode.

For a vehicle body structure including a frame member made of a high-strength material, such as a high-tensile steel sheet, it is required to improve both a deformation capability and a load resistance. For example, Patent Document 1 discloses a product which is made of a sheet metal and is provided with a low-hardness area and a high-hardness area, by using a technology of partially changing the hardness of a member.

PRIOR ART DOCUMENT

Patent Document

[Patent Document 1] PCT International Publication No. WO2012/118223

DISCLOSURE OF THE INVENTION

Problems to be Solved by the Invention

When a vehicle body structure including a frame member in which the hardness thereof is partially changed, such as the frame member disclosed in Patent Document 1 described above, however, simply has a softened layer that improves the deformation capability in the frame member, further improvement in the load resistance is limited, while the deformation capability is ensured. That is, in the vehicle body structure using a high strength frame member, higher-level deformation capability and load resistance are both required.

The present invention has been made in view of the problem described above. An object of the present invention is to provide a novel and improved vehicle body structure that allows assurance of the deformation capability and improvement in the load resistance.

Means for Solving the Problem

The summary of the present invention is as follows.
(1) An aspect of the present invention is a vehicle body structure including a frame member which includes a first top section, a corner section provided at an end portion of the first top section, a vertical wall section extending from an end portion of the corner section, and a second top section which faces the first top section, and a first support section and a second support section which are provided on the second top section, wherein $L/h \leq 6.7$ is satisfied, where h represents a length between an outer surface of the first top section and an outer surface of the second top section, and L represents a length between the first support section and the second support section, the vertical wall section is provided with a softened layer, in the vertical wall section, the softened layer is provided on an area extending from a bending stop of the corner section toward the widthwise direction of the vertical wall section by a length of h/3, hardness of a sheet-thickness-direction central section in a portion where the softened layer is provided is greater than or equal to 400 Hv, and the softened layer is an area having hardness smaller by at least 10 Hv than the hardness of the sheet-thickness-direction central section in the portion where the softened layer is provided, a thickness of the softened layer is greater than or equal to 2% of the sheet thickness in the portion where the softened layer is provided but smaller than 20% of the sheet thickness in the portion where the softened layer is provided, the hardness of the softened layer at the surface is greater than or equal to 0.5 times the hardness of the sheet-thickness-direction central section in the portion where the softened layer is provided but smaller than 0.9 times the hardness of the sheet-thickness-direction central section in the portion where the softened layer is provided, the softened layer has a first hardness changing area that is an area extending from the surface to 40% of the thickness of the softened layer in the sheet thickness direction and a second hardness changing area that is an area different from the first hardness changing area out of the softened layer, an absolute value $\Delta Hv1$ of a change in hardness of the first hardness changing area in the sheet thickness direction is greater than an absolute value $\Delta Hv2$ of a change in hardness of the second hardness changing area in the sheet thickness direction.
(2) In the vehicle body structure according to the above (1), the softened layer may be provided on a surface continuing to a surface of an outer bending side of the corner section in the vertical wall section.
(3) In the vehicle body structure according to the above (1) or (2), the softened layers may be provided on a surface continuing to a surface of an inner bending side of the corner section and a surface continuing to a surface of an outer bending side of the corner section in the vertical wall section.
(4) In the vehicle body structure according to any one of the above (1) to (3), the softened layer may be provided on at least one of a surface of an inner bending side and a surface of an outer bending side of the corner section toward the sheet thickness direction.
(5) In the vehicle body structure according to any one of the above (1) to (4), in the first top section, the softened layer may be provided on an area extending from the corner section by a length not less than ½ of the first top section in the widthwise direction.
(6) In the vehicle body structure according to any one of the above (1) to (5), in the second top section of the frame member, the first support section or the second support section may be formed by attaching a cross member to the frame member in a direction substantially orthogonal to the longitudinal direction of the frame member.

(7) In the vehicle body structure according to any one of the above (1) to (6), the first support section or the second support section may be formed by setting a bending strength of the first support section or the second support section to be higher than a bending strength of a part of the frame member between the first support section and the second support section.

Effects of the Invention

The present invention provides a vehicle body structure that allows improvement both in the deformation capability and the load resistance at the time of collision.

EMBODIMENTS OF THE INVENTION

Figure 1:
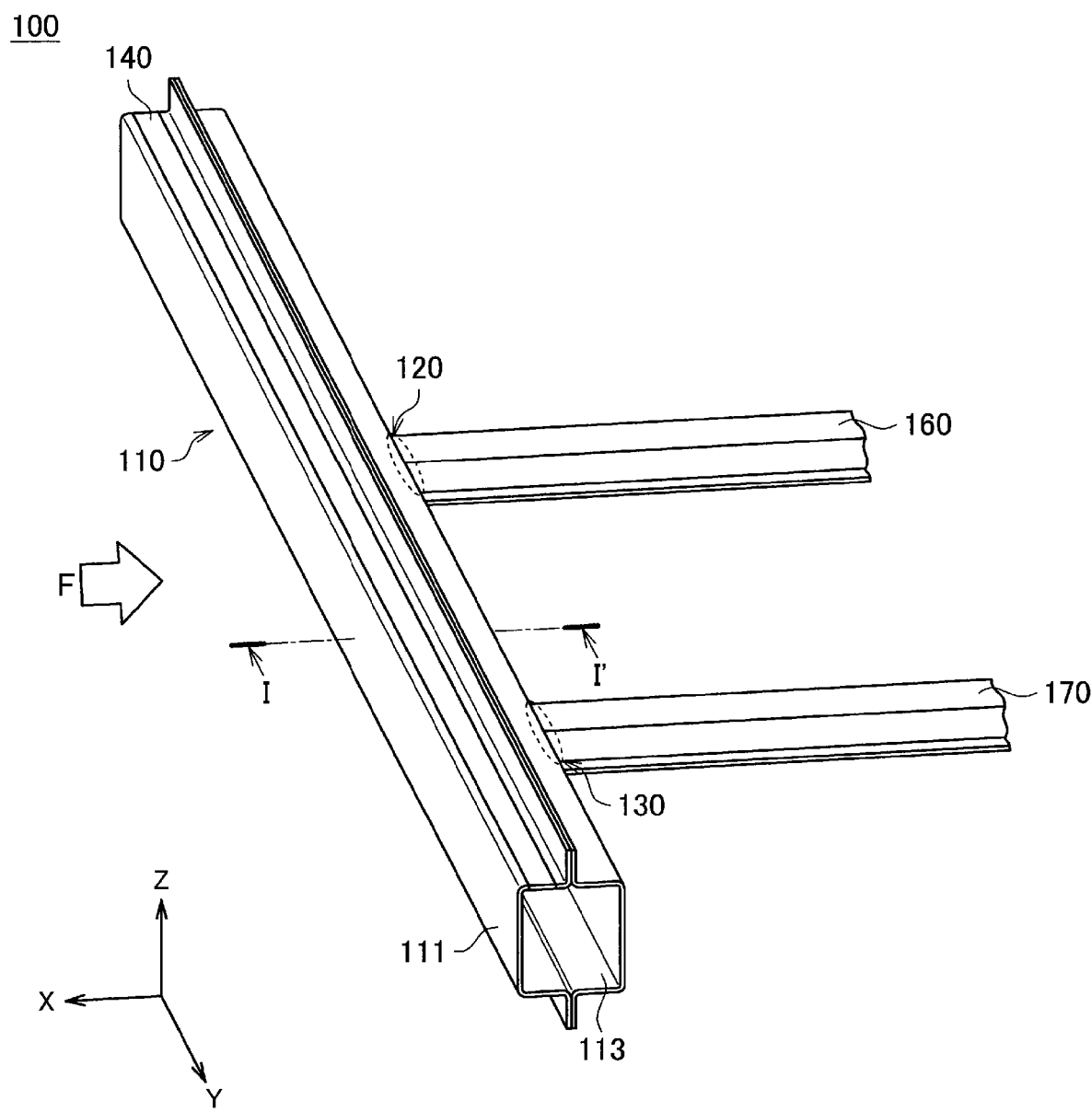
FIG. 1 is a perspective view showing an example of a vehicle body structure according to a first embodiment of the present invention.

Preferable embodiments of the present invention will be described below in detail with reference to the accompanying drawings. In the present specification and drawings, components having substantially the same functional configuration have the same reference character and will not be redundantly described.

1. First Embodiment (Exterior View Example of the Vehicle Body Structure)

First, with reference to FIG. 1, a vehicle body structure 100 according to a first embodiment of the present invention will be explained. FIG. 1 is a perspective view showing the vehicle body structure 100 according to the first embodiment. The vehicle body structure 100 according to the first embodiment forms a part of a vehicle body. The vehicle body structure 100 includes a frame member 110, a first support section 120, and a second support section 130.

As shown in FIG. 1, the frame member 110 is a member with a closed cross-section in a cross-sectional view (X-Z plane view) in which the normal direction thereof corresponds to the longitudinal direction, which is the Y direction in FIG. 1. The frame member 110 includes the first member 111 and the second member 113. As shown in FIG. 1, the frame member 110 may bear a load F from the outside. The frame member 110 is arranged so that the first member 111 bears the load F. The load F is mainly input to a first top section 111a of the first member 111.

Further, as shown in FIG. 1, at a plane that faces the first top section 111a of the frame member 110 (that is, a second top section 113a of the second member 113), a first support section 120 and a second support section 130 are provided. The first support section 120 and the second support section 130 support the frame member 110 in response to the input of the load F.

(Example of the Vehicle Body Structure)

The vehicle body structure 100 according to the first embodiment may be a floor structure having a side sill realized by a frame member 110 as shown in FIG. 1. In this case, floor cross members realized by a first cross member 160 and a second cross member 170 are provided on a plane facing the first top section 111a (corresponding to a second top section 113a described later), so as to extend in the direction substantially orthogonal to the longitudinal direction of the frame member 110. The first support section 120 and the second support section 130 are respectively formed by the first cross member 160 or the second cross member 170.

(Cross-Section Structure of the Frame Member)

Figure 2:
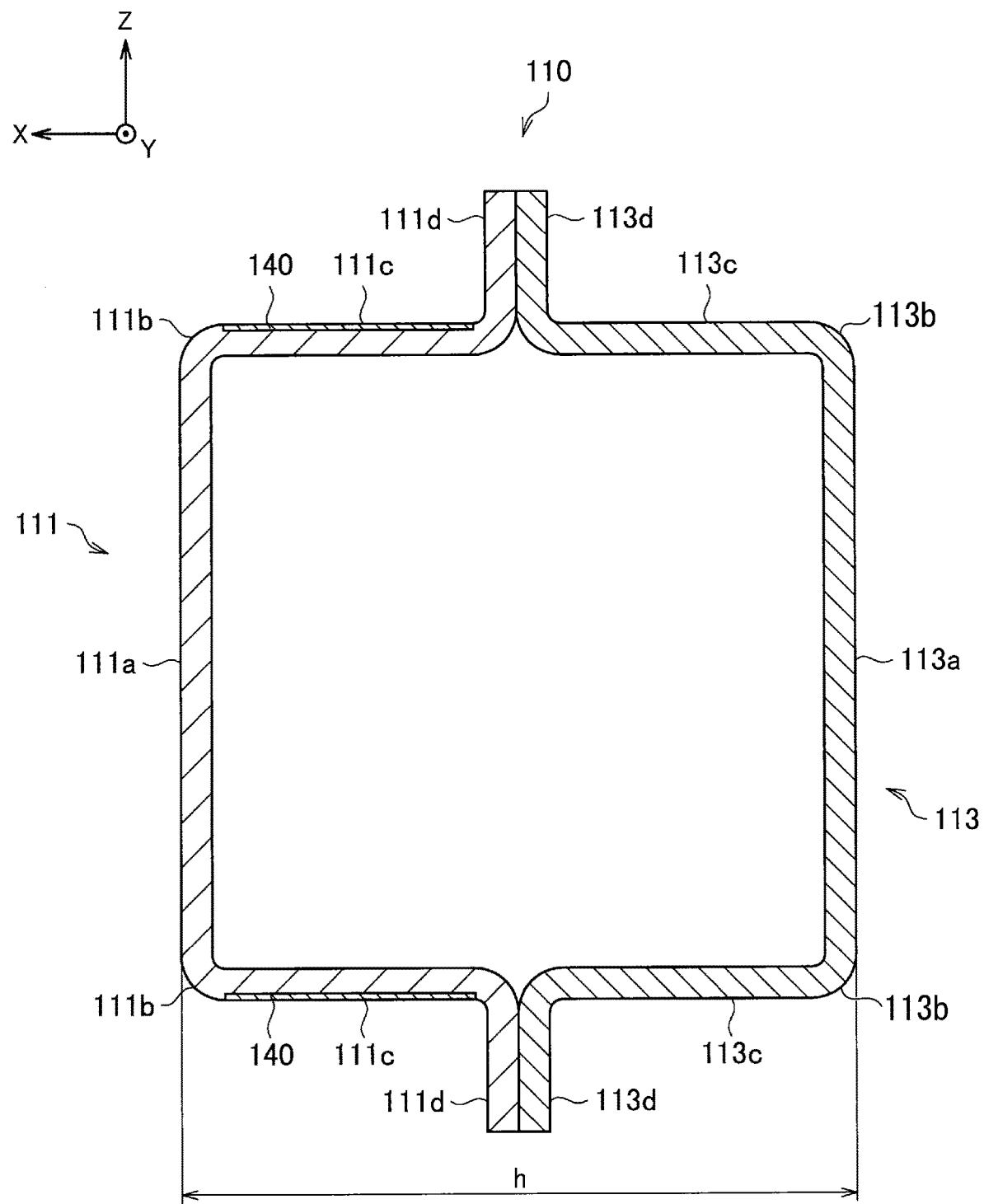
FIG. 2 is an end elevation view of the frame member according to the first embodiment taken along I-I' in FIG. 1.

Next, with reference to FIG. 2, explanations will be made for the cross-section structure of the frame member 110 according to the first embodiment. FIG. 2 shows I-I' cross-sectional view in FIG. 1, showing an example of a cross-section structure of the frame member 110 according to the first embodiment. As shown in this FIG. 2, the frame member 110 includes a first member 111 and a second member 113. The frame member 110 is formed by the first member 111 and the second member 113 so as to have a closed cross-sectional shape in a cross-section of X-Z plane.

The first member 111 is a substantially hat-shaped member in the cross-sectional view in the X-Z plane. That is, the first member 111 includes a first top section 111a, vertical wall sections 111c which extend from end portions of the first top section 111a in the widthwise direction (Z direction) via corner sections 111b, and flange sections 111d which are respectively bent outward from one end of the vertical wall section 111c opposite to the other end continuing to the first top section 111a. Further, in the first member 111, at least a part of the vertical wall section 111c is provided with a softened layer 140 which will be descried later.

The second member 113 is a substantially hat-shaped member in the cross-sectional view in the X-Z plane. That is, the second member 113 includes a second top section 113a, vertical wall sections 113c extending from end portions of the second top section 113a in the widthwise direction (Z direction) via corner sections 113b, and flange sections 113d each of which is respectively bent outward from one end of the vertical wall section 113c opposite to the other end continuing to the second top section 113a. On the second top section 113a, the first support section 120 and the second support section 130 are formed.

That is, the frame member 110 includes, as shown in FIG. 2, a first top section 111a, corner sections 111b provided at end portions of the first top section 111a, vertical wall sections 111c extending from each end portion of the corner sections 111b, and a second top section 113a facing the first top section 111a.

The first member 111 and the second member 113 may be formed from various types of metal sheet members. In particular, the first member 111 and the second member 113 may be respectively formed from a steel sheet. For example, a steel having a tensile strength of not less than 1470 MPa (1.5 GPa class, 1.8 GPa class, or greater) may be used. The steel sheets used for the first member 111 and the second member 113 may have a sheet thickness of about 0.5 to 3.5 mm, or about 1.0 to 2.9 mm. The first member 111 and the second member 113 may be formed by applying known techniques of various processing technologies to a metal sheet member (blank material).

The first member 111 and the second member 113 are joined together at each of the flange sections 111d and 113d, whereby the frame member 110 has a closed cross-section structure. The joining method is not limited; a known joining technique such as a laser welding or a spot welding may be used.

(Configuration of Corner Section of Frame Member)

Figure 3:
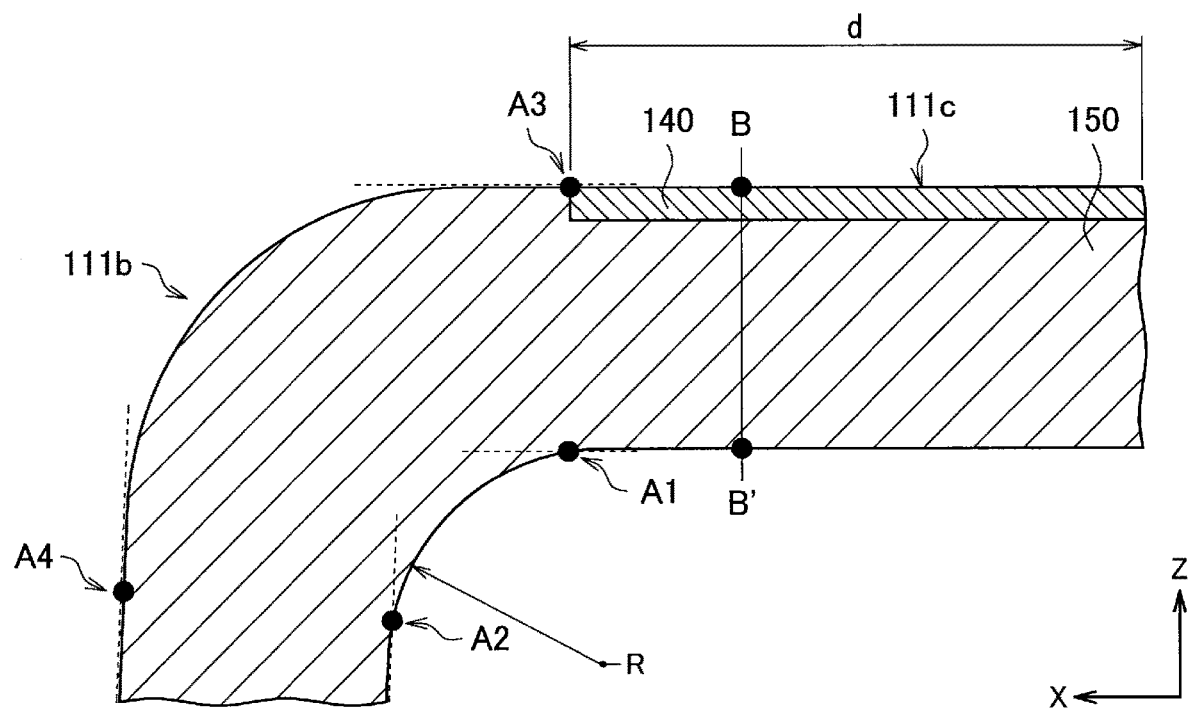
FIG. 3 is a cross-sectional view of a region including a bending ridge portion according to the first embodiment taken along the plane X-Z.

The configuration of an area including the corner section 111b according to the first embodiment will next be described with reference to FIG. 3. FIG. 3 is a cross-sectional view of the area including the corner section 111b according to the first embodiment taken along the plane X-Z. The corner section 111b is a bent section present between the first top section 111a and each of the vertical wall sections 111c and has a predetermined bending radius R, which will be described later. As shown in FIG. 3, the corner section 111b is formed in the area defined by R-stop points A1 and A2, which are present on the inner bending side, and R-stop points A3 and A4, which are present on the outer bending side, in the cross-sectional view taken along the plane X-Z.

The bending radius R may be set to a value considering a sheet thickness t of the corner section 111b, for example, a value satisfying R/t≤8.0. If the R/t≤8.0 is satisfied, the vertical wall section 111c becomes less likely to be deflected at the time of bending deformation by the collision, thus the load resistance of the corner section 111b increases especially at the initial timing of the stroke. In addition to this, in the middle timing of the stroke and the later timing of the stroke, it is possible to maintain high load resistance. The bending radius R may be preferably set to a value satisfying R/t≤2.5. If R/t≤2.5 is satisfied, the load resistance of the corner section will increase and the collision performance will improve. It should be noted that the lower limit value of R/t is not specifically limit, but in view of the formability, it is preferable to satisfy R/t≥0.5, and it is more preferable to satisfy R/t≥0.9. The bending radius R may be determined by obtaining, from an image of a cross-section of a corner section 111b, in an inner bending side, three points of R-stop point A1, R-stop point A2, and bending central point of the corner section 111b (that is, a point positioned at a half of length between R-stop points A1 and A2 in the corner section 111b), and then, calculating a curvature using these three points based on known mathematical methods.

(Configuration of Softened Layer)

Further, with reference to FIG. 3, explanations will be made for a softened layer 140 according to the first embodiment. On a surface side of the first member 111 of the frame member 110, at least a part of the vertical wall section 111c is formed with the softened layer 140. Specifically, the softened layer 140 is provided on a surface side continuing to an outer bending side of the corner section 111b. Further, the softened layer 140 formed on the vertical wall section 111c has at least a length d in the widthwise direction (X direction in FIG. 3) of the vertical wall section 111c, from R-stop point A3 of the corner section 111b. Here, the length d is a length corresponding to h/3, where the h represents a length between the outer surface of the first top section 111a and the outer surface of the second top section 113a.

The softened layer 140 may be continuously or partially formed along the lengthwise direction of the frame member 110 (direction Y in FIG. 1). The softened layer 140 is formed from the surface of the frame member 110 to a predetermined depth in the sheet thickness direction. The thickness of the softened layer 140 on the frame member 110 according to the first embodiment is greater than or equal to 2% but smaller than 20% of the sheet thickness of the frame member 110. The sheet thickness used herein refers to the overall thickness in the sheet thickness direction of the frame member 110, including the softened layer 140 and a sheet-thickness-direction central section 150, which will be described later. When the thickness of the softened layer 140 is greater than or equal to 20% of the sheet thickness of the frame member 110, the ratio of the softened layer 140 to the frame member 110 increases, so that the frame member 110 cannot maintain a load resistance required for the frame member 110. The thickness of the softened layer 140 is preferably smaller than or equal to 17%, and more preferably smaller than or equal to 14% of the sheet thickness of the frame member 110.

On the other hand, when the thickness of the softened layer 140 is smaller than 2% of the sheet thickness of the frame member 110, the ratio of the softened layer 140 to the frame member 110 is small, so that the deformation capability is not achieved. The thickness of the softened layer 140 is preferably greater than or equal to 5% of the sheet thickness of the frame member 110, and more preferably, greater than or equal to 8% of the sheet thickness of the frame member 110.

As shown in FIG. 3, a central area in the sheet-thickness-direction of the frame member 110 (the sheet-thickness-direction area of the frame member 110 excluding the softened layer 140) forms the sheet-thickness-direction central section 150. The softened layer 140 is an area having hardness lower than the hardness of the sheet-thickness-direction central section 150 by at least 10 Hv.

The hardness of the softened layer 140 on the surface of the frame member 110 is greater than or equal to 0.5 times the hardness of the sheet-thickness-direction central section 150 but smaller than 0.9 times the hardness of the sheet-thickness-direction central section 150. The surface of the frame member 110 refers to the surface of the base material of the frame member 110 excluding an applied film and a plated layer thereon. The hardness of the surface of the frame member 110 is measured by performing a Vickers hardness test specified in JIS Z 2244:2009 on a cross-section of the base material. The measurement is performed so that a measurement point is located at a depth smaller than or equal to 20 µm from the surface of the base material and the indentation has a size smaller than or equal to 10 µm. When the hardness of the surface is smaller than 0.5 times the hardness of the sheet-thickness-direction central section 150, the surface layer of the frame member becomes too soft and therefore the load resistance and the impact absorption characterization cannot be fully achieved at the time of collision. The softened layer 140 on the surface of the frame member 110 preferably has a hardness greater than or equal to 0.6 times the hardness of the sheet-thickness-direction central section 150.

On the other hand, when the hardness of the surface is greater than or equal to 0.9 times the hardness of the sheet-thickness-direction central section 150, it is difficult to sufficiently improve the deformation capability. The softened layer 140 on the surface of the frame member 110 preferably has hardness smaller than 0.8 times the hardness of the sheet-thickness-direction central section 150.

The hardness of the sheet-thickness-direction central section 150 is greater than or equal to 400 Hv in Vickers hardness. When the frame member is made of steel having a Vickers hardness of 400 Hv or greater, it is difficult for the frame member to maintain the deformation capability at the time of collision. That is, when the sheet-thickness-direction central section 150 of the frame member 110 has a Vickers hardness of 400 Hv or greater, the softened layer 140 according to the first embodiment noticeably improves the deformation capability. The Vickers hardness of the sheet-thickness-direction central section 150 of the frame member 110 is preferably greater than or equal to 500 Hv, more preferably, greater than or equal to 600 Hv.

The upper limit of the hardness of the sheet-thickness-direction central section 150 is not particularly specified but may be 800 HV in view of the formability and other factors of the frame member 110.

For example, within the above-mentioned range of the hardness of the sheet-thickness-direction central section 150, the hardness of the softened layer 140 on the surface of the frame member 110 may be greater than or equal to 250 Hv in Vickers hardness. Further, within the above-mentioned range of the hardness of the sheet-thickness-direction central section 150, the hardness of the softened layer 140 on the surface of the frame member 110 may be lower than or equal to 500 Hv in Vickers hardness. A method for measuring the hardness of the frame member 110 at the surface of the area of the softened layer 140 and at the sheet-thickness-direction central section 150 will be described later in detail.

The softened layer 140 may be formed on the surface of the frame member 110 by applying a variety of known surface processing, surface finishing, or thermal treatment technologies. The method for forming the softened layer 140 may, for example, be a partial tempering using laser heating or high-frequency heating performed on the areas corresponding to the corner sections 111*b* and the vertical wall sections 111*c*. The frame member 110 including the softened layers 140 in predetermined areas may be formed by processing a blank having the softened layer described above formed on the surface layer in advance.

Figure 4:
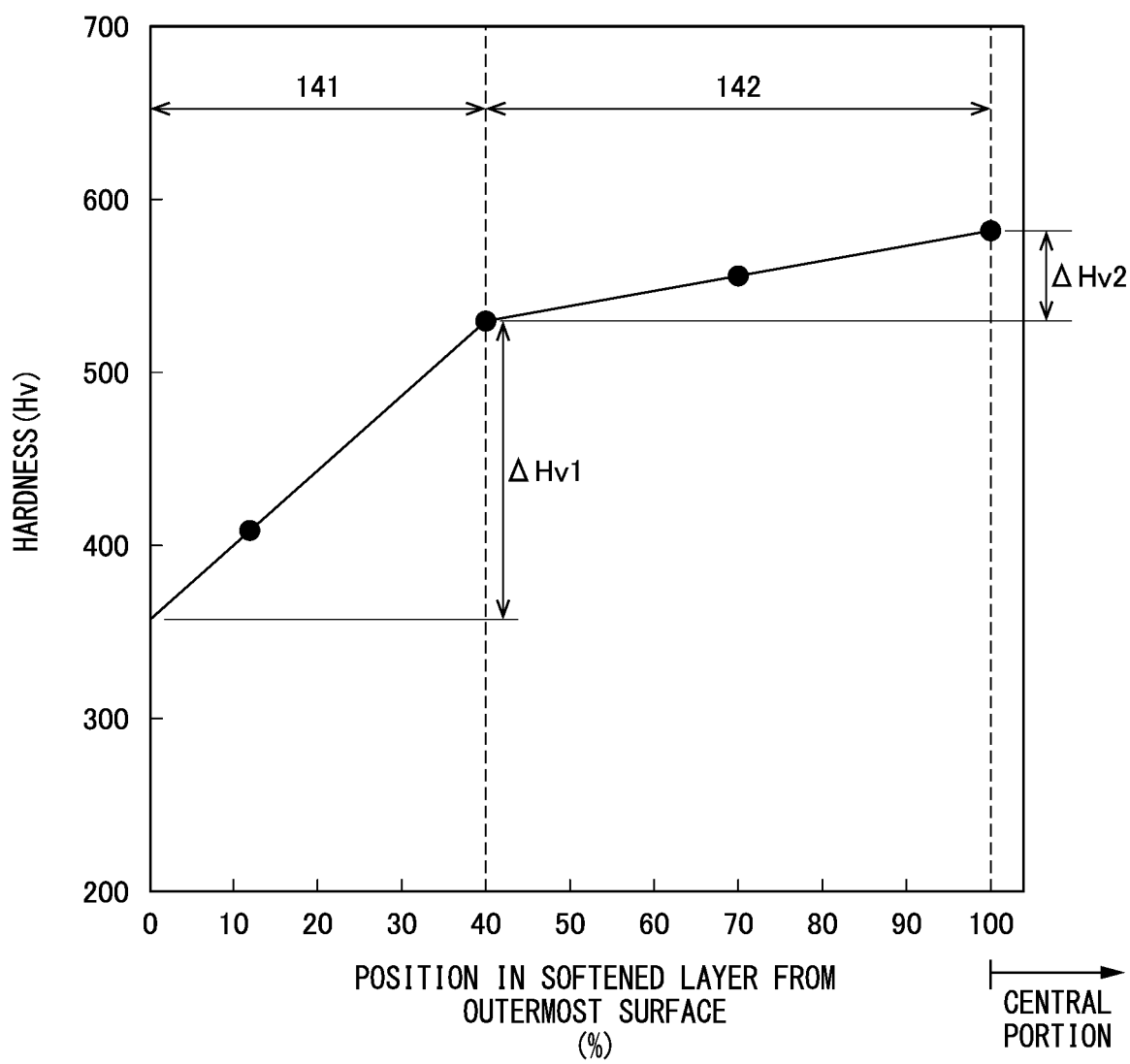
FIG. 4 shows an example of a hardness change between B-B' in FIG. 3, in a softened layer according to the first embodiment.

FIG. 4 shows an example of a change along the line B-B' in FIG. 3 in the hardness of the softened layer 140 in the first embodiment. FIG. 4 shows the result of an experiment in which the frame member 110 according to the first embodiment is produced in hot press using steel for hot stamping so that the steel is formed in a hat shape having a tensile strength as large as 2.0 GPa class and the results of measurement of the sheet-thickness-direction Vickers hardness of a softened layer 140 are plotted in the form of a graph. The softened layer 140 has a first hardness changing area 141, which is present in the surface side of the frame member 110, and a second hardness changing area 142, which is present between the first hardness changing area 141 and the sheet-thickness-direction central section 150, as shown in FIG. 4. The second hardness changing area 142 is an area of the softened layer 140 that is the area excluding the first hardness changing area 141. The first hardness changing area 141 and the second hardness changing area 142 are each an area where the sheet-thickness-direction hardness changes at a predetermined gradient, and the first hardness changing area 141 and the second hardness changing area 142 have absolute values ΔHv1 and ΔHv2, respectively, which represent changes in hardness and differ from each other.

The first hardness changing area 141 ranges from the surface of the frame member 110 to 40% of the entire thickness of the softened layer 140, as shown in FIG. 4. The second hardness changing area 142 continuously extends from the first hardness changing area 141 of the softened layer 140 to the sheet-thickness-direction central section 150 of the frame member 110.

The absolute value ΔHv1 of the change in hardness of the first hardness changing area 141 is greater than the absolute value ΔHv2 of the change in hardness of the second hardness changing area 142, as shown in FIG. 4. The reason for the above is that the frame member 110 is too soft when ΔHv2 is greater than ΔHv1 so that it is impossible to obtain a sufficient loading characterization.

The absolute value ΔHv1 of the change in hardness of the first hardness changing area 141 is greater than or equal to 100 Hv but smaller than 200 Hv. When ΔHv1 is greater than or equal to 100 Hv, stress concentration at the time of the bending deformation can be further reduced, whereby the bending characteristics can be further improved. When ΔHv1 is smaller than 200 Hv, the effect of reducing the stress concentration at the time of the bending deformation can be further enhanced, whereby more satisfactory bending characteristics are provided. Therefore, when ΔHv1 is greater than or equal to 100 Hv but smaller than 200 Hv, satisfactory bending characteristics are provided, and the deformation capability of the frame member 110 can be improved, whereby the load resistance and the impact absorption characterization are both achieved. The absolute value ΔHv1 of the change in hardness of the first hardness changing area 141 is therefore preferably greater than or equal to 100 Hv but smaller than 200 Hv, as described above.

(Hardness Measurement Method and Hardness Change Calculation Method)

A method for measuring the hardness of the sheet-thickness-direction central section 150 is as follows. A cross-section of a sample in the form of a sheet that is a cross-section perpendicular to the sheet surface of the sample is collected, and a measurement surface is prepared as a sample under measurement, followed by a hardness test. A method for preparing the measurement surface is carried out in compliant with JIS Z 2244:2009. After any of #600 to #1500 silicon carbide sheets are used to polish the measurement surface, and a liquid made of a diluting liquid, such as alcohol, or pure water in which diamond powder having a granularity ranging from 1 to 6 μm is dispersed is used to finish the polished measurement surface into a mirror surface. The hardness test is carried out based on the method specified in JIS Z 2244. A micro Vickers hardness tester is used to measure the hardness of the sample at ten points spaced apart from each other by at least three times the size of the indentation at the depth equal to half the sheet thickness of the sample under a load of 1 kgf, and average the measured values to determine the hardness of the sheet-thickness-direction central section 150.

A method for measuring the hardness of each of the first hardness changing area 141 and the second hardness changing area 142 will next be described. After collecting a sample such that a cross-section perpendicular to the sheet surface becomes a measurement surface, and processing the measurement surface, the sample is used in the hardness test. To accurately measure the hardness of the portion in the vicinity of the surface of the sample, the measurement surface is prepared so that the amount of irregularities is minimized and no sag is produced in the vicinity of the surface. In the preparation, a cross-section polisher manufactured by JOEL Ltd. is used to perform argon ion beam sputtering on the measurement surface. In this case, to suppress occurrence of stripe-shaped irregularities on the measurement surface, a sample rotating holder manufactured by JOEL Ltd. is used to omnidirectionally irradiate the measurement surface with the argon ion beam.

The micro Vickers hardness tester is used to measure the hardness of the sample having the prepared measurement surface. The hardness of the sample is measured under the load of 1 kgf in the area corresponding to the softened layer of the sample under the surface of the sample at points spaced apart from each other by at least three times the size of the indentation in the direction perpendicular to the sheet surface (sheet thickness direction). In this case, the total number of measurement points varies in accordance with the sheet thickness of the sample. As for the number of measurement points for the calculation of ΔHv1 and ΔHv2, which will be described later, a largest possible number of measurement points are set based on the specification described in JIS Z 2244:2009 with inter-measurement-point intervals large enough to prevent the indentations from affecting the measurement. The measurement position closest to the surface of the sample is set within the area ranging from the sheet surface (when a plated layer is present, immediately below the plated layer or immediately below an alloy layer between the plated layer and the base material) to the depth of 20 μm. The reason for this is that a large amount of soft microstructure is present in a surface portion closest to the surface of the base material.

In the case of a sample in which the softened layer 140 is placed on each side of the sheet-thickness-direction central section 150, the same measurement is performed on the first surface side of the sample and on the second surface side opposite the first surface.

A method for calculating ΔHv1 will next be described. That is, a hardness gradient Δa in the first hardness changing area 141 is calculated by using Expression (1) based on all measurement points present in the area from the surface of the sample to a depth corresponding to 40% of the overall thickness of the softened layer (first hardness changing area 141). In Expression (1), $a_i$ represents the ratio (%) of the distance from the surface to the i-th measurement point to the overall thickness of the softened layer, $c_i$ represents the Vickers hardness (Hv) at $a_i$, and n represents the total number of all measurement points present in the area from the surface to the depth corresponding to 40% of the overall thickness of the softened layer (first hardness changing area 141).

[Math. 1]

$$\Delta a = \frac{n\sum_{i=1}^{n} a_i c_i - \sum_{i=1}^{n} a_i \sum_{i=1}^{n} c_i}{\sum_{i=1}^{n} a_i^2 - \left(\sum_{i=1}^{n} a_i\right)^2} \quad \text{Expression (1)}$$

In Expression (1),

Δa: Gradient (Hv/%) of change in hardness in sheet thickness direction in first hardness changing area, $a_i$: Ratio (%) of distance from surface to i-th measurement point to the overall thickness of softened layer, $c_i$: Vickers hardness (Hv) at and n: Total number of all measurement points present in first hardness changing area on a first surface side.

In the case of a sample in which the softened layer 140 is placed on each side of the sheet-thickness-direction central section 150, Δa1 on the first surface side is calculated based on the result of the measurement of the hardness on the first surface side, and Δa2 on the second surface side is calculated based on the result of the measurement of the hardness on the second surface side. The arithmetic average of Δa1 and Δa2 can be defined as Δa.

Δa determined by using Expression (1) is multiplied by the ratio of the sheet-thickness-direction thickness of the first hardness changing area 141 to the overall thickness of the softened layer, whereby the ΔHv1 can be determined.

A method for calculating ΔHv2 will next be described. That is, a hardness gradient ΔA in the second hardness changing area 142 is calculated by using Expression (2) based on all measurement points present in the area from the depth corresponding to 40% to the depth of the overall thickness of the softened layer on the surface side of the sample to the depth corresponding to 100% thereof (second hardness changing area 142). In Expression (2), $A_i$ represents the ratio (%) of the distance from the surface to the i-th measurement point to the overall thickness of the softened layer, $C_i$ represents the Vickers hardness (Hv) at $A_i$, and N represents the total number of all measurement points present in the area from the depth corresponding to 40% of the overall thickness of the softened layer on the surface side to the depth corresponding to 100% thereof (second hardness changing area 142).

[Math 2]

$$\Delta A = \frac{N\sum_{i=1}^{N} A_i C_i - \sum_{i=1}^{N} A_i \sum_{i=1}^{N} C_i}{\sum_{i=1}^{N} A_i^2 - \left(\sum_{i=1}^{N} A_i\right)^2} \quad \text{Expression (2)}$$

In Expression (2),

ΔA: Gradient (Hv/%) of change in hardness in sheet thickness direction in second hardness changing area, $A_i$: Ratio (%) of distance from surface to i-th measurement point to the overall thickness of softened layer, $C_i$: Vickers hardness (Hv) at $A_i$, and N: Total number of all measurement points present in second hardness changing area on a first surface side.

In the case of a sample in which the softened layer 140 is placed on each side of the sheet-thickness-direction central section 150, ΔA1 on the first surface side is calculated based on the result of the measurement of the hardness on the first surface side, and ΔA2 on the second surface side is calculated based on the result of the measurement of the hardness on the second surface side. The arithmetic average of ΔA1 and ΔA2 can be defined as ΔA.

ΔA determined by using Expression (2) is multiplied by the ratio of the sheet-thickness-direction thickness of the second hardness changing area 142 to the overall thickness of the softened layer, whereby the ΔHv2 can be determined.

(Deformation Manner)

Figure 5:
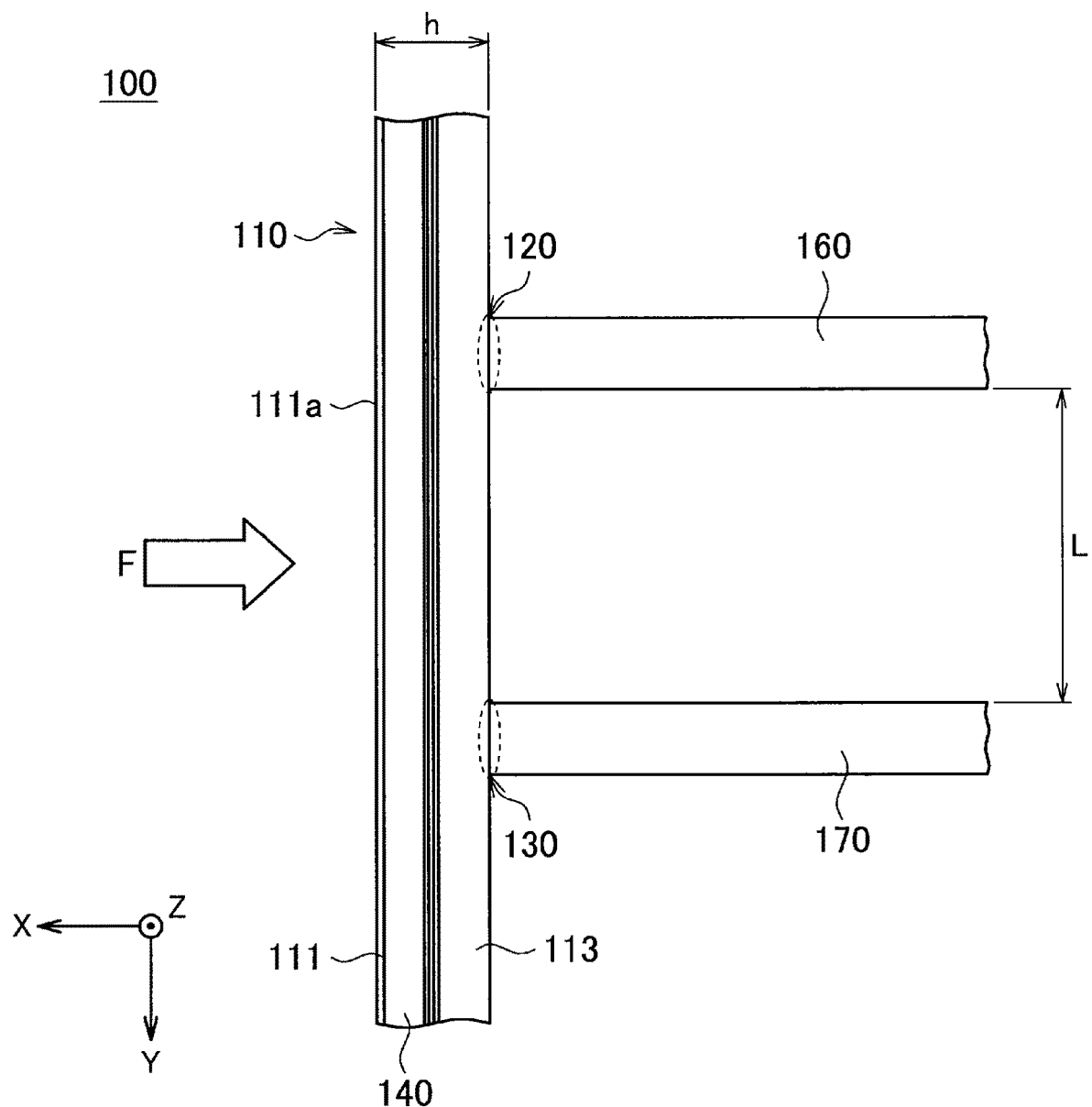
FIG. 5 is a plan view of the vehicle body structure according to the first embodiment.

The deformation manner of the vehicle body structure 100 according to the first embodiment will subsequently be described with reference to FIG. 5. FIG. 5 shows a plan view of the vehicle body structure 100 according to the first embodiment. As described above, when the load F is applied in the direction orthogonal to the longitudinal direction of the frame member 110 to the first top section 111a of the frame member 110 (see the arrow in the drawing), the bending deformation may occur. In this situation, in the frame member 110 according to the first embodiment, the softened layer 140 improves the deformation capability of the frame member 110.

Regarding the deformation capability of the frame member 110, the present inventors discovered that sufficient deformation capability cannot be fully improved in some conditions of a vehicle body structure 100 provided with the frame member 110. That is, when the load F is input, the frame member 110 deforms in a bending mode from the position at which the load F is input as a starting point, there is a case in which an effect of improving the deformation capability cannot be fully achieved.

Thus, the present inventors studied conditions of the vehicle body structure 100 by which the improving effect of the deformation capability can be fully achieved in the frame member 110 having the softened layer 140. As a result, the inventors found that when the vehicle body structure 100 satisfies the following Expression (3), the frame member 110 according to the first embodiment fully achieves a sufficient deformation capability.

$$L/h \leq 6.7 \qquad \text{Expression (3)}$$

In Expression (3),

L: Length (mm) between the first support section 120 and the second support section 130.

h: Length (mm) between the outer surface of the first top section 111a of the frame member 110 and the outer surface of the second top section 113a in the frame member 110.

As shown in FIG. 5, in the vehicle body structure 100 satisfying the above Expression (3), when the load F is input to the first top section 111a of the frame member 110, the frame member 110 is supported by the first support section 120 and the second support section 130. In this situation, the frame member 110 deforms in a manner that a whole member is crushed from the first top section 111a. That is, first, in the frame member 110, the first top section 111a is deformed so as to be concaved. Then, the vertical wall section 111c crushes while undergoing an out-of-plane deformation at a broad area. As a result, the effect of improving the deformation capability of the frame member 110 obtained by providing the softened layer 140 can be fully obtained.

Especially, the frame member 110 according to the first embodiment is formed from a high strength steel of 1470 MPa class or greater in tensile strength. In this case, in order to allow the frame member 110 be entirely deformed while being crushed at the time of deformation, it is required to satisfy Expression (3). That is, in the frame member 110 using a high tensile steel sheet, the strength is sufficiently high, therefore, only a local deformation likely happens and therefore the deformation capability cannot be fully achieved.

According to the first embodiment, the vehicle body structure 100 has a proper arrangement condition of the members such as the frame member 110, and the frame member 110 includes a softened layer 140 having certain characteristics such as hardness and thickness. Because of these features, it is possible to improve both the deformation capability and the load resistance of the frame member 110 in the vehicle body structure 100. That is, in the vehicle body structure 100, it is possible to increase the energy absorption amount and further increase the impact absorption performance. Especially, even if the frame member 110 is formed from a high strength steel, it is possible to improve the deformation capability of the frame member 110 by making each section such as the first top section 111a, the corner sections 111b, and the vertical wall sections 111c be sufficiently deformed.

In the first embodiment, the first member 111 and the second member 113 are welded together at each of the flange sections 111d and 113d, but the present invention is not limited to this example. For example, the first member 111 and the second member 113 each having the substantially hat shape may be welded together at areas in the vicinity of end portions of the vertical wall sections 111c and 113c.

Further, the first embodiment suggests an example in which the softened layer 140 is provided on an entire area of the frame member 110 in the longitudinal direction, but the present invention is not limited to this example. The softened layer 140 may be provided on at least an area in the longitudinal direction between the first support section 120 and the second support section 130. Further, the softened layer 140 may not be continuously provided along the longitudinal direction of the frame member 110. The softened layer 140 may be partially or intermittently provided along the longitudinal direction of the frame member 110.

Further, the first embodiment suggests an example in which the first support section 120 and the second support section 130 are both formed by providing the first cross member 160 and the second cross member 170 on the second top section 113a of the frame member 110, but the present invention is not limited to this example. For example, the first support section 120 or the second support section 130 may be formed by making an end portion of the frame member 110 in the longitudinal direction to contact with another member so as to be supported.

It should be noted that the minimum value of L/h is not limited, but if L/h is excessively small, the member will not be bent and crushed, but will be flatly deformed, therefore, there is a case in which an improvement of the loading characterization cannot be expected. Therefore, the minimum value of L/h may be set to be 2.0.

Explanations of the vehicle body structure 100 according to the first embodiment of the present invention are as above.

Modified Example 1

Figure 6:
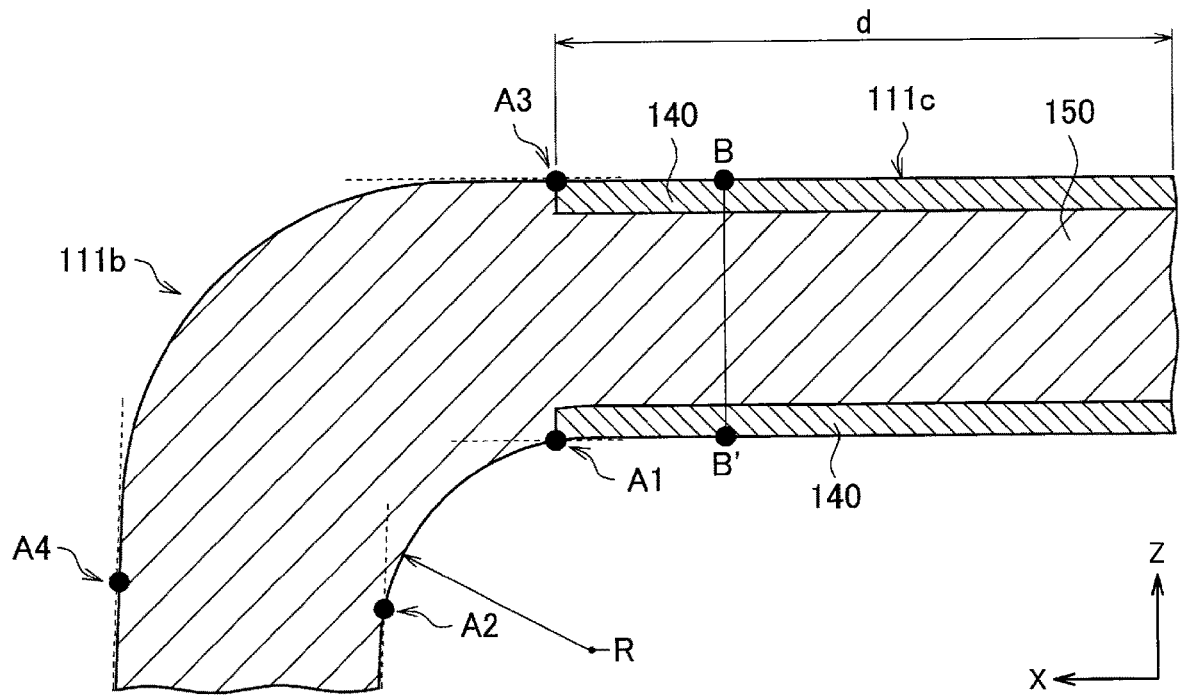
FIG. 6 is a cross-sectional view of a region including a bending ridge portion according to a modified example of the first embodiment taken along the plane X-Z.

A modified example of the frame member 110 according to the first embodiment will subsequently be described with reference to FIG. 6. FIG. 6 is a cross-sectional view of a region including a bending ridge portion according to a modified example of the first embodiment taken along the plane X-Z. In this modified example, softened layers 140 are provided on both a surface continuing to an inner bending side of the corner section 111b and a surface continuing to an outer bending side of the corner section 111b. Explanations of some of mutual configurations which have already been explained in the first embodiment will be omitted.

In this modified example, as shown in FIG. 6, the softened layers 140 are provided on both surfaces of the vertical wall section 111c. That is, in the vertical wall section 111c, the softened layer 140 is provided on one surface continuing to the outer bending side of the corner section 111b. Further, in the vertical wall section 111c, the softened layer 140 is provided on the other surface continuing to the inner bending side of the corner section 111b.

The softened layers 140 formed on the vertical wall section 111c respectively has a length of at least h/3 from R-stop points A1 and A3 of the corner section 111b. Here, the h represents a length from an outer surface of the first top section 111a to an outer surface of the second top section 113a of the frame member 110.

According to this modified example, the softened layers 140 are provided on both surfaces of the vertical wall section 111c, here, both surfaces means that one surface continuing to the inner bending side of the corner section 111b and the other surface continuing to the outer bending side of the corner section 111b. Thus, the deformation capability of the frame member 110 can be further improved. Because of the arrangement condition of the members constituting the vehicle body structure 100, it is possible to promote the deformation of the vertical wall section 111c while allowing the frame member 110 to be deformed in a crushing manner. Therefore, in the vehicle body structure 100, it is possible to improve both the deformation capability and the load resistance of the frame member 110.

Modified Example 2

Figure 7:
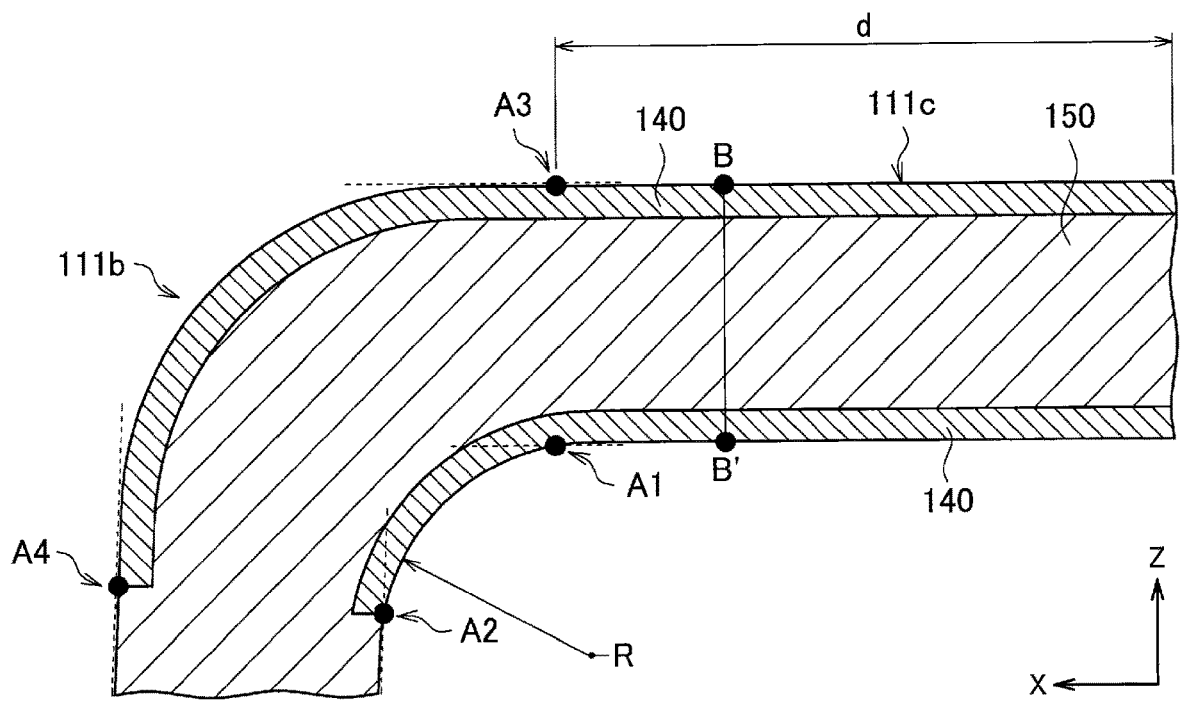
FIG. 7 is a cross-sectional view of a region including a bending ridge portion according to another modified example of the first embodiment taken along the plane X-Z.

Another modified example of the frame member 110 according to the first embodiment will subsequently be described with reference to FIG. 7. FIG. 7 shows a cross-section of a region including a corner section 111b according to another modified example of the first embodiment taken along the plane X-Z. In this modified example, the softened layers 140 are also provided on the corner section 111b. Explanations of some of mutual configurations which have already been explained in the first embodiment will be omitted.

As shown in FIG. 7, on the surfaces of the frame member 110, the softened layer 140 may be provided on one of the inner bending side and the outer bending side of the corner section 111b, or on each of the inner bending side and the outer bending side of the corner section 111b. Especially, the softened layer 140 may be provided on the outer bending side of the corner section 111b. The softened layer 140 is continuously formed on the vertical wall section 111c.

According to this modification, because the softened layer 140 is also provided on the corner section 111b, the deformation capability of the frame member 110 can be further improved. Further, because of the arrangement condition of the members constituting the vehicle body structure 100, it is possible to promote the deformation of the vertical wall section 111c while allowing the frame member 110 to be deformed in a crushing manner. Therefore, it is possible to improve the impact absorption performance of the vehicle body structure 100.

Further, the softened layer 140 may be provided on the first top section 111a so as to extend from the corner section 111b with at least ½ length of the first top section 111a in the widthwise direction (Z direction in FIG. 7). In this case, the deformation capability of the frame member 110 can be further improved. Because of the arrangement condition of the members constituting the vehicle body structure 100, it is possible to promote the deformation of the vertical wall section 111c while allowing the frame member 110 to be deformed in a crushing manner. Therefore, it is possible to improve both the deformation capability and the load resistance of the frame member 110 in the vehicle body structure 100.

Modified Example 3

Figure 8:
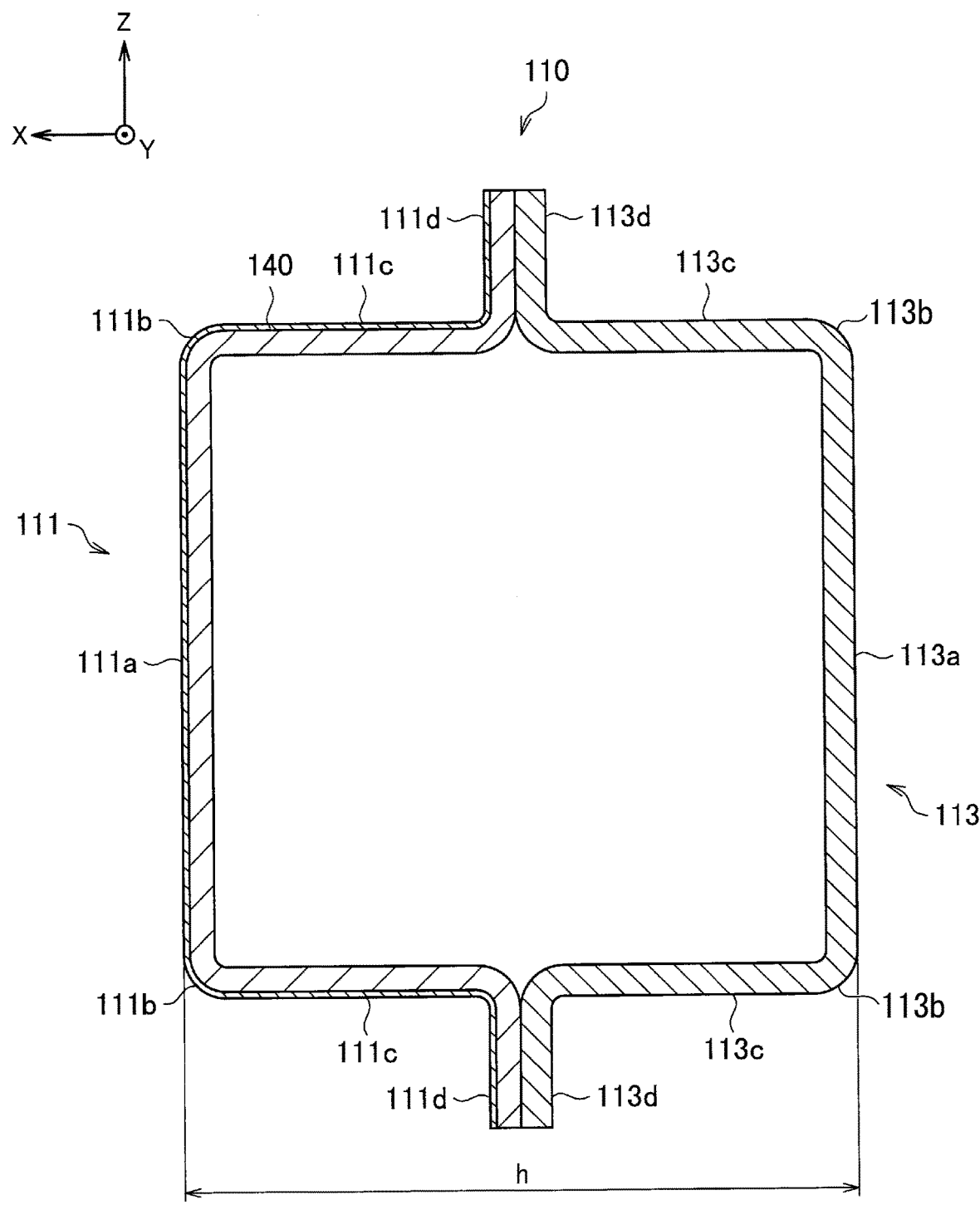
FIG. 8 is a cross-sectional view of a frame member according to another modified example of the first embodiment taken along the plane X-Z.

Another modified example of the frame member 110 according to the first embodiment will subsequently be described with reference to FIG. 8. FIG. 8 shows a cross-sectional view of a frame member 110 according to another modified example of the first embodiment taken along the plane X-Z. In this modified example, the softened layer 140 is provided on the outer surface of the first member 111. Explanations of some of mutual configurations which have already been explained in the first embodiment will be omitted.

As shown in FIG. 8, in the first member 111, the softened layer 140 is formed on a whole surface of the outer side of the closed cross-section of the frame member 110. That is, the outer surfaces of the first top section 111a, the corner sections 111b, the vertical wall sections 111c, and the flange sections 111d of the first member 111 are provided with the softened layer 140. In this case, the deformation capability of the frame member 110 can be further improved. Because of the arrangement condition of the members constituting the vehicle body structure 100, it is possible to promote the deformation of the vertical wall section 111c while allowing the frame member 110 to be deformed in a crushing manner. Therefore, it is possible to improve both the deformation capability and the load resistance of the frame member 110 in the vehicle body structure 100.

Modified Example 4

Figure 9:
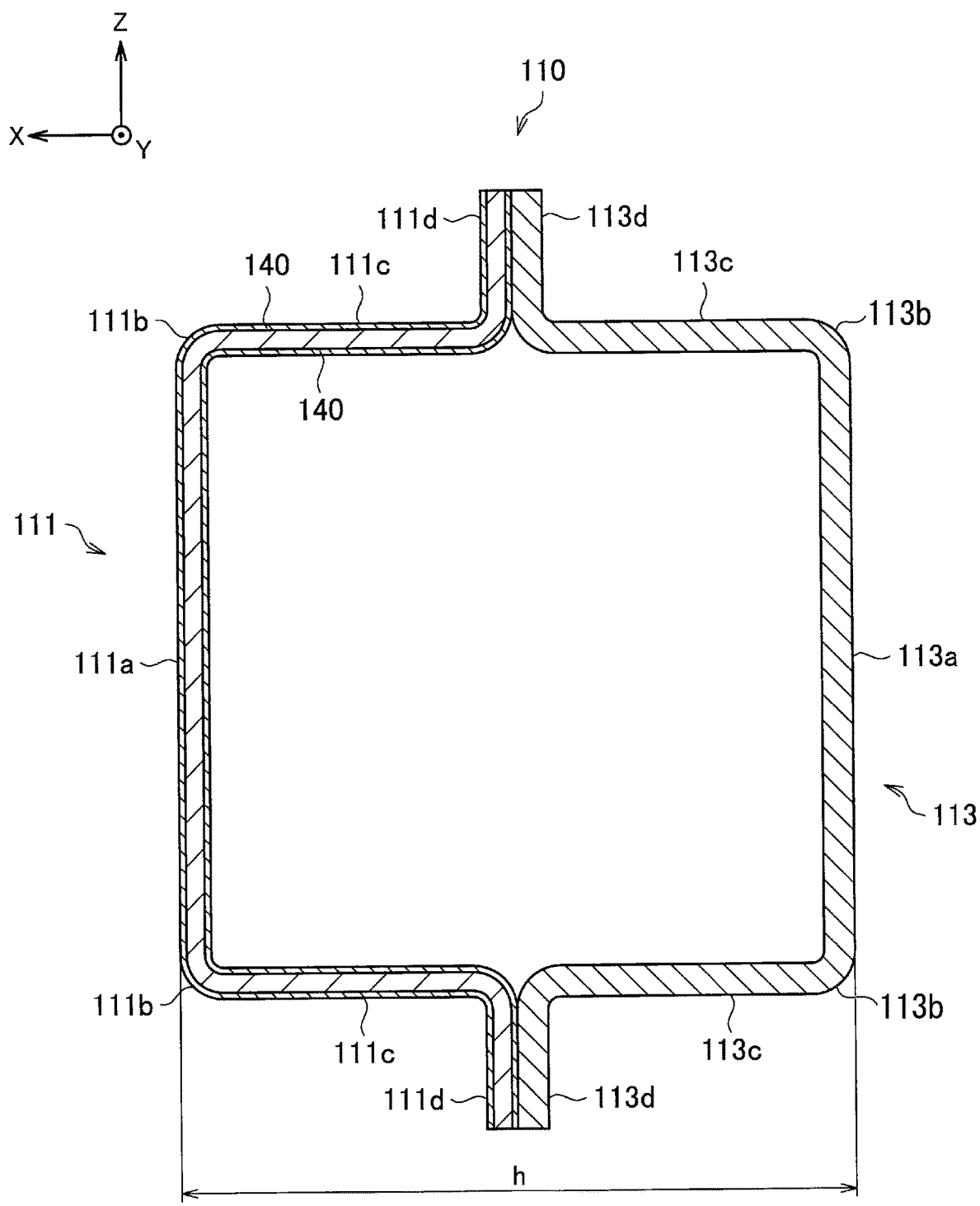
FIG. 9 is a cross-sectional view of a frame member according to another modified example of the first embodiment taken along the plane X-Z.

Another modified example of the frame member 110 according to the first embodiment will subsequently be described with reference to FIG. 9. FIG. 9 shows a cross-sectional view of a frame member 110 according to another modified example of the first embodiment taken along the plane X-Z. In this modified example, the softened layers 140 are provided on both surfaces of the first member 111. Explanations of some of mutual configurations which have already been explained in the above first will be omitted.

As shown in FIG. 9, in the first member 111, one softened layer 140 is formed on a whole surface of the outer side of the closed cross-section of the frame member 110, and in this first member 111, the other softened layer 140 is formed on a whole surface of the inner side of the closed cross-section of the frame member 110. That is, both surfaces of the first top section 111a, the corner sections 111b, the vertical wall sections 111c, and the flange sections 111d of the first member 111 are respectively provided with the softened layer 140. Thus, the deformation capability of the frame member 110 can be further improved. Because of the arrangement condition of the members constituting the vehicle body structure 100, it is possible to promote the deformation of the vertical wall section 111c while allowing the frame member 110 to be deformed in a crushing manner. Therefore, it is possible to improve the deformation capability and the load resistance of the frame member 110 in the vehicle body structure 100.

2. Second Embodiment

Figure 10:
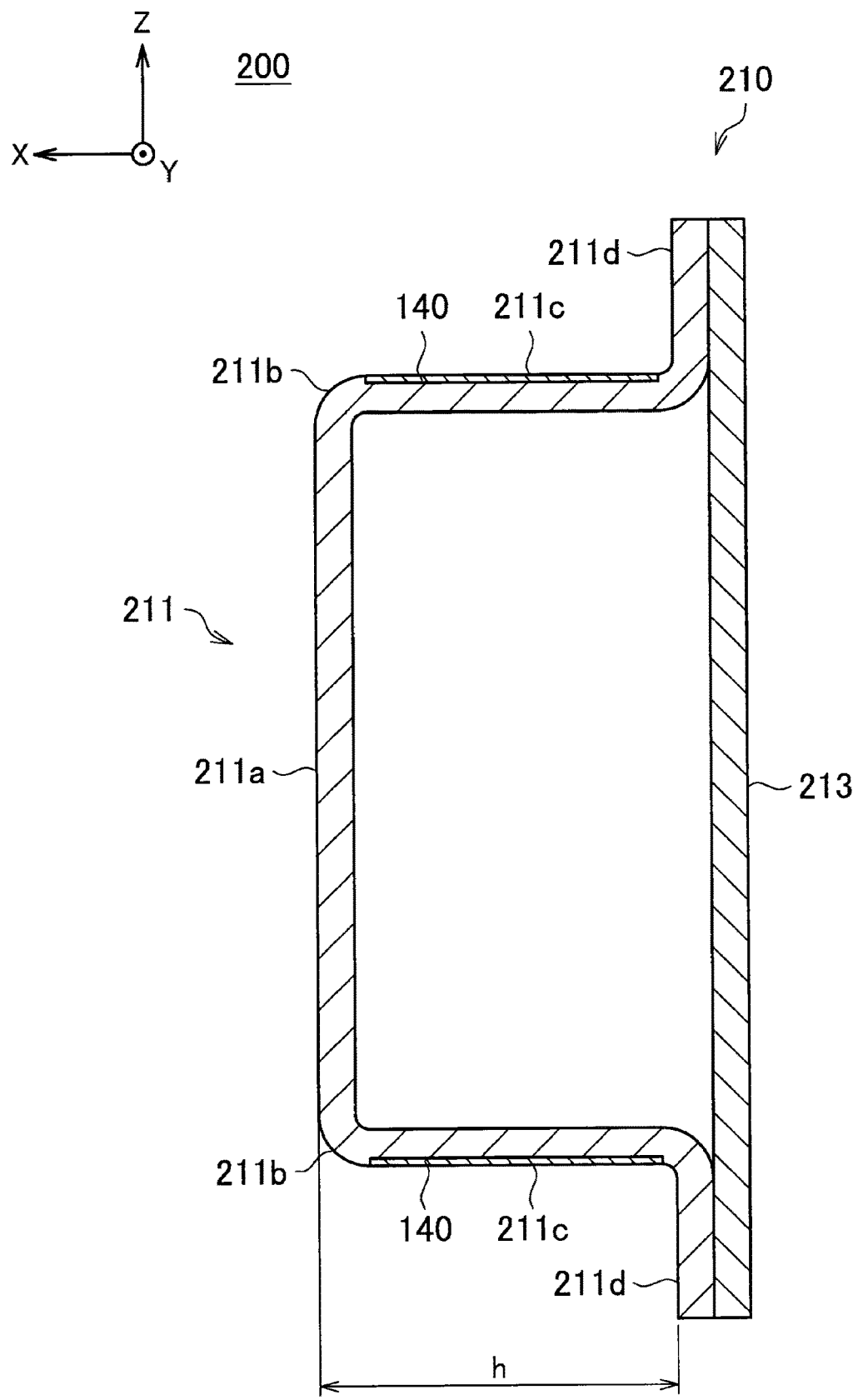
FIG. 10 is a cross-sectional view of a frame member according to a second embodiment of the present invention taken along the plane X-Z.

The second embodiment of the present invention will subsequently be described with reference to FIG. 10. FIG. 10 shows a cross-sectional view of the frame member 210 according to the second embodiment taken along the plane X-Z. In the second embodiment, the frame member 210 has single-hat cross-section and is different from the first embodiment in this point. In the following explanation, explanations of some of mutual configurations which have already been explained in the first embodiment will be omitted.

As shown in FIG. 10, the frame member 210 includes a first member 211 having a substantially hat-like shape cross-section when viewed from the widthwise direction. Further, a second member 213, which is a flat member, is used as a closing plate.

The first member 211 includes a first top section 211a, vertical wall sections 211c which extend from end portions of the first top section 211a in the widthwise direction (Z direction) via corner sections 211b, and flange sections 211d which are respectively bent outward from one end of the vertical wall section 211c opposite to the other end continuing to the first top section 211a. Further, in the first member 211, at least a part of the vertical wall section 211c is provided with a softened layer 140. The first member 211 is joined with the second member 213 by welding at the flange sections 211d.

In the second embodiment, as shown in FIG. 10, the h used in Expression (3) represents a length in the X direction from an outer surface of the closed cross-section of the first top section 211a to one surface (which opposites to a surface to which other member is joined by welding) of the flange section 211d.

According to the second embodiment, the vehicle body structure 200 has a proper arrangement condition of the members such as the frame member 210, and the frame member 210 includes a softened layer 140 having certain characteristics such as hardness and thickness. Because of these features, even in a case in which a frame member 210 has a single-hat configuration in which a second member is a flat member and thus the deformable region is not secured, it is possible to improve both the deformation capability and the load resistance. That is, in the vehicle body structure 200, it is possible to increase the energy absorption amount by the frame member 210 and further improve the impact absorption performance. Explanations of the vehicle body structure 200 according to the second embodiment of the present invention are as above.

3. Third Embodiment

Figure 11A:
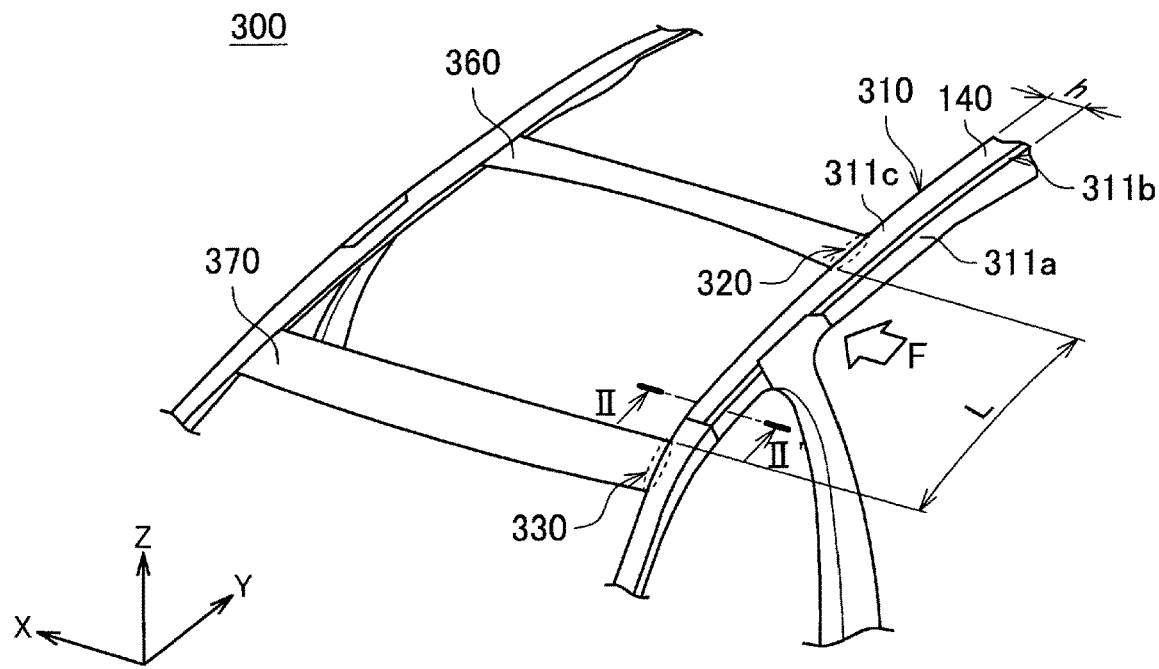
FIG. 11A is a perspective view showing an example of a vehicle body structure according to a third embodiment of the present invention.
Figure 11B:
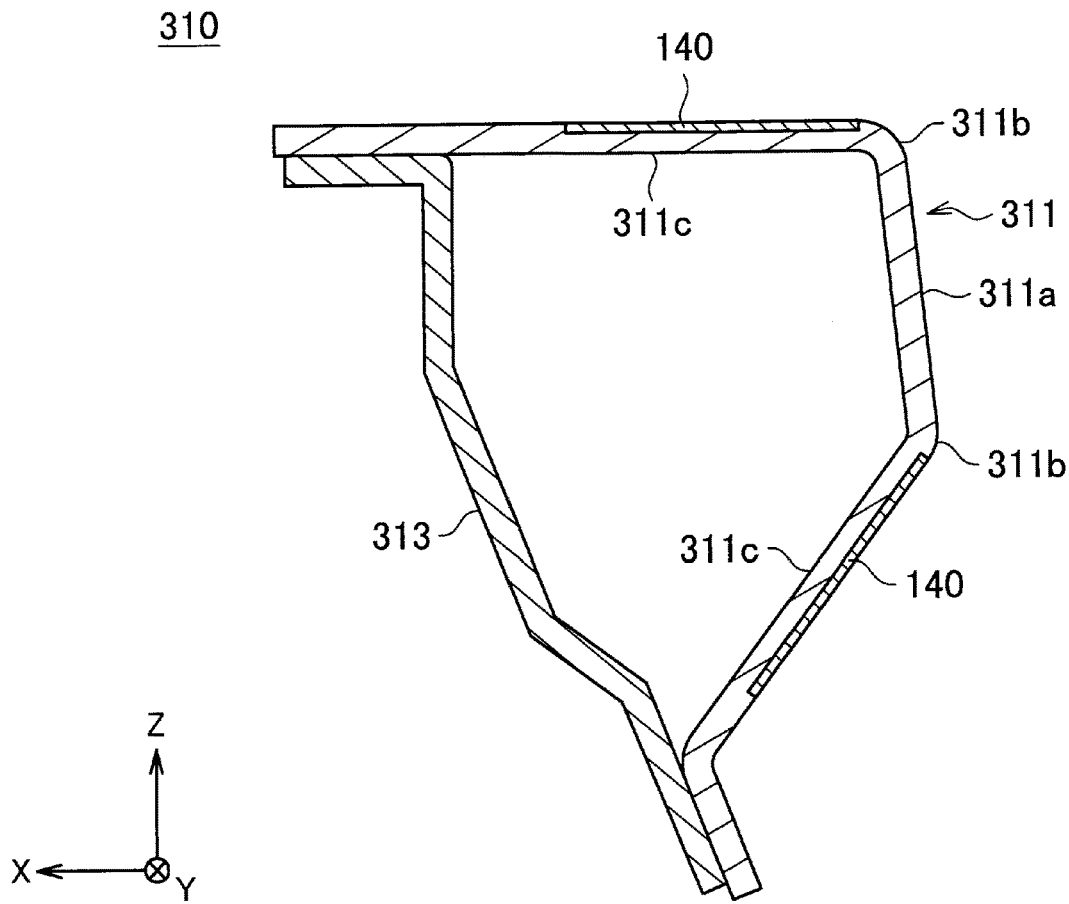
FIG. 11B is an end elevation view of the frame member according to the third embodiment taken along II-II' in FIG. 11A.
Figure 11C:
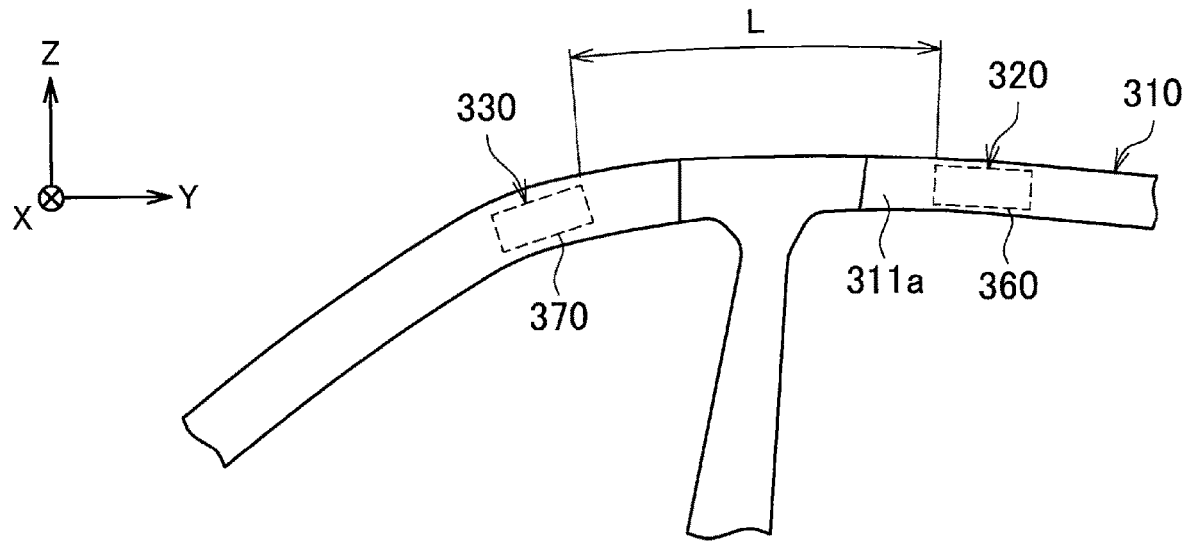
FIG. 11C is a side view of the vehicle body structure according to the third embodiment.

The third embodiment of the present invention will subsequently be described with reference to FIG. 11A, FIG. 11B, and FIG. 11C. FIG. 11A is a perspective view of an example of a vehicle body structure 300 according to the third embodiment. FIG. 11B is an end elevation view of the vehicle body structure 300 taken along II-II' in FIG. 11A. FIG. 11C is a side view of the vehicle body structure 300 according to the third embodiment. In the present embodiment, the vehicle body structure 300 is used as a roof structure of the vehicle body and is different from other embodiments in this point. In the following explanation, some of mutual configurations which have already been explained in the other embodiments will be omitted.

As shown in FIG. 11A, the vehicle body structure 300 according to the third embodiment is a roof structure constituting an upper section of the vehicle body. The vehicle body structure 300 includes a frame member 310, a first support section 320, and a second support section 330. More specifically, the vehicle body structure 300 includes a roof side rail corresponding to the frame member 310. Further, roof cross members corresponding to a first cross member 360 and a second cross member 370 are provided on one surface of the frame member 310 opposite to another surface of the first top section 311a. The roof cross members extend along the direction (X direction) substantially orthogonal to the longitudinal direction of the frame member 310. The first support section 320 and the second support section 330 are formed by the first cross member 360 or the second cross member 370.

As shown in FIG. 11A, the frame member 310 may bear a load F from the outside. The frame member 310 is arranged so that the first member 311 bears the load F. The load F is mainly input to the first top section 311a of the first member 311.

As shown in FIG. 11B, the frame member 310 includes a first member 311 and a second member 313. The frame member 310 is formed to have a closed cross-sectional shape in a cross-section of X-Z plane by the first member 311 and the second member 313. The first member 311 includes the first top section 311a corresponding to a top section, and vertical wall sections 311c extending from end portions of the first top section 311a in the widthwise direction (Z direction) via corner sections 311b. Further, in the frame member 310, at least a part of the vertical wall section 311c is provided with a softened layer 140.

As shown in FIG. 11C, the frame member 310 is partially curved so as to protrude toward the Z direction in FIG. 11C. In the third embodiment, as shown in FIG. 11C, the L used in Expression (3) represents a length between the first support section 320 and the second support section 330, along the longitudinal direction of the frame member 310.

According to the third embodiment, the vehicle body structure 300 has a proper arrangement condition of the members such as the frame member 310, and the frame member 310 includes a softened layer 140 having certain characteristics such as hardness and thickness. Because of these features, even in a case in which the vehicle body structure 300 is a roof structure or other similar structure and the frame member 310 has a curving shape, it is possible to improve the deformation capability and the load resistance. In the vehicle body structure 300, it is possible to increase the energy absorption amount by the frame member 310 and further increase the impact absorption performance Explanations of the vehicle body structure 300 according to the third embodiment of the present invention are as above.

4. Fourth Embodiment

Figure 12A:
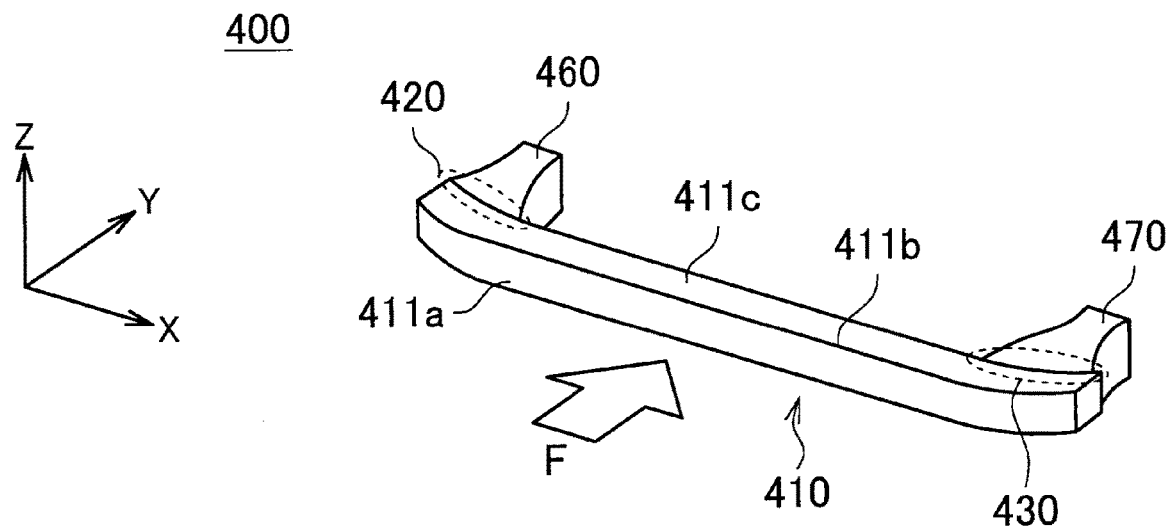
FIG. 12A is a perspective view showing an example of a vehicle body structure according to a fourth embodiment of the present invention.
Figure 12B:
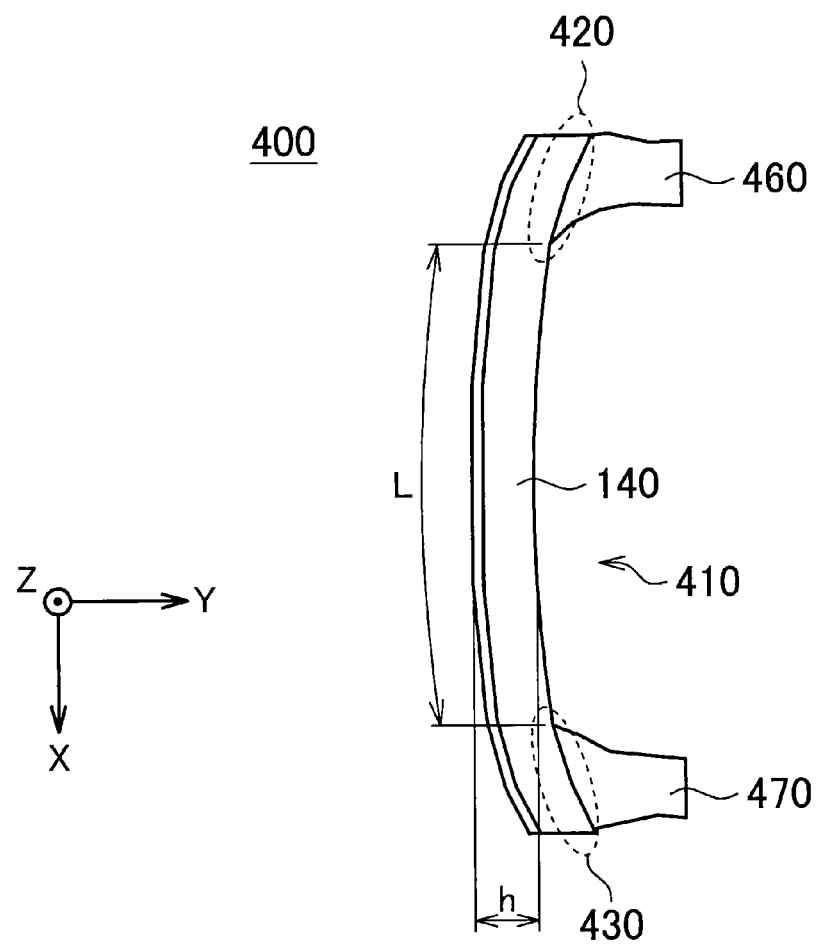
FIG. 12B is a plan view of an example of a vehicle body structure according to the fourth embodiment.

The fourth embodiment of the present invention will subsequently be described with reference to FIG. 12A and FIG. 12B. FIG. 12A is a perspective view of an example of a vehicle body structure 400 according to the fourth embodiment. FIG. 12B is a plan view of the vehicle body structure 400 according to the fourth embodiment. In the fourth embodiment, the vehicle body structure 400 is used as a front bumper structure of the vehicle body and is different from other embodiments in this point. In the following explanation, explanations of some of mutual configurations which have already been explained in the other embodiments will be omitted.

As shown in FIG. 12A, the vehicle body structure 400 according to the fourth embodiment is a front bumper structure constituting a front section in the vehicle-longitudinal direction of the vehicle body. The vehicle body structure 400 includes a frame member 410, a first support section 420, and a second support section 430. More specifically, the vehicle body structure 400 includes a bumper reinforce member corresponding to the frame member 410. Further, crash box members corresponding to a first cross member 460 and a second cross member 470 are provided on one surface of the frame member 410 opposite to another surface of a first top section 411a. The crash box members extend along the direction (Y direction) substantially orthogonal to the longitudinal direction of the frame member 410. The first support section 420 and the second support section 430 are formed by the first cross member 460 or the second cross member 470.

As shown in FIG. 12A, the frame member 410 may bear a load F from the outside. The load F is mainly input to the first top section 411a of the frame member 410. The frame member 410 includes the first top section 411a corresponding to a top section, and vertical wall sections 411c extending from end portions of the first top section 411a in the widthwise direction (Z direction) via corner sections 411b. Further, on the frame member 410, at least a part of the vertical wall section 411c is provided with a softened layer 140.

As shown in FIG. 12B, the frame member 410 is partially curved so as to protrude toward the Y direction in FIG. 12B. In the fourth embodiment, as shown in FIG. 12B, the L used in Expression (3) represents a length between the first support section 420 and the second support section 430, along the longitudinal direction of the frame member 410.

According to the fourth embodiment, the vehicle body structure 400 has a proper arrangement condition of the members such as the frame member 410, and the frame member 410 includes a softened layer 140 having certain characteristics such as hardness and thickness. Because of these features, even in a case in which the vehicle body structure 400 is a front bumper structure or similar structure and the frame member 410 has a curving shape, it is possible to improve the deformation capability and the load resistance of the frame member in the vehicle body structure 400. In the vehicle body structure 400, it is possible to increase the energy absorption amount by the frame member 410 and further increase the impact absorption performance. Explanations of the vehicle body structure 400 according to the fourth embodiment of the present invention are as above.

5. Fifth Embodiment

Figure 13A:
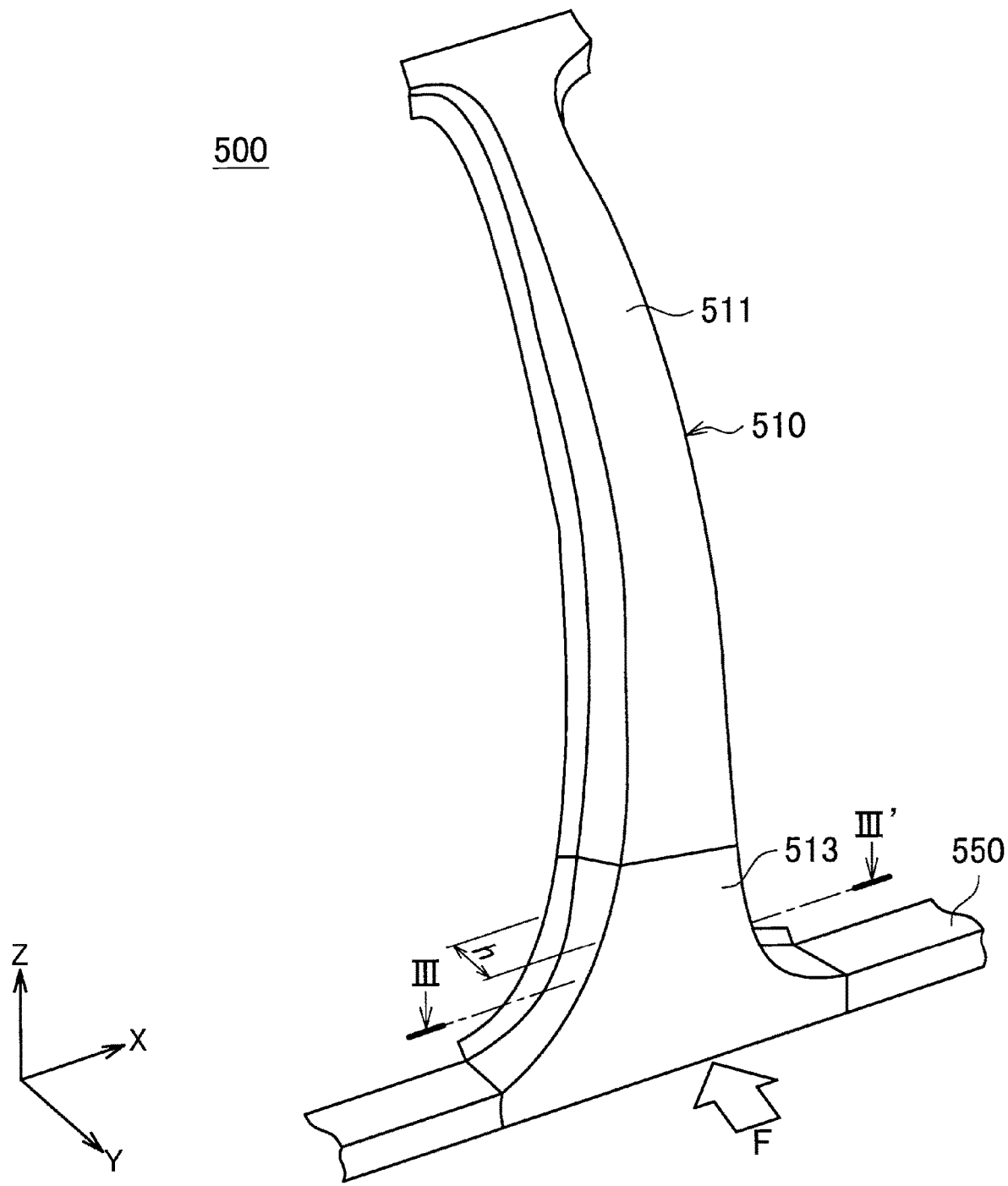
FIG. 13A is a perspective view showing an example of a vehicle body structure according to a fifth embodiment of the present invention.
Figure 13B:
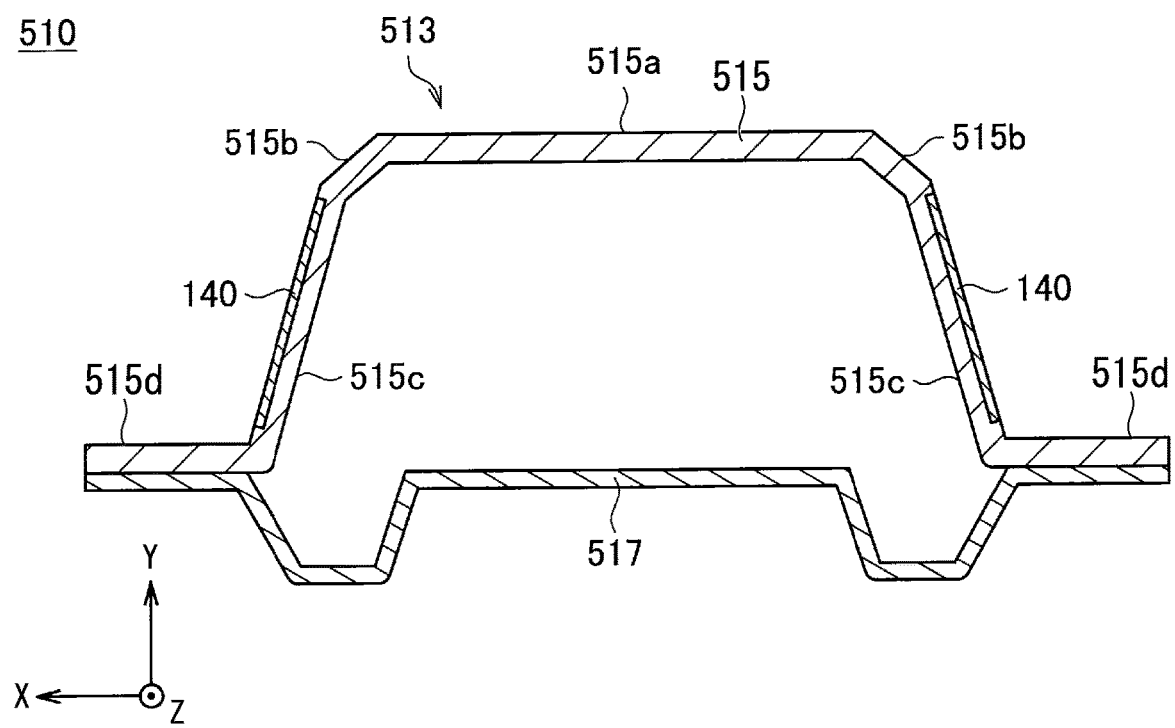
FIG. 13B is an end elevation view of the vehicle body structure according to the fifth embodiment taken along III-III' in FIG. 13A.
Figure 13C:
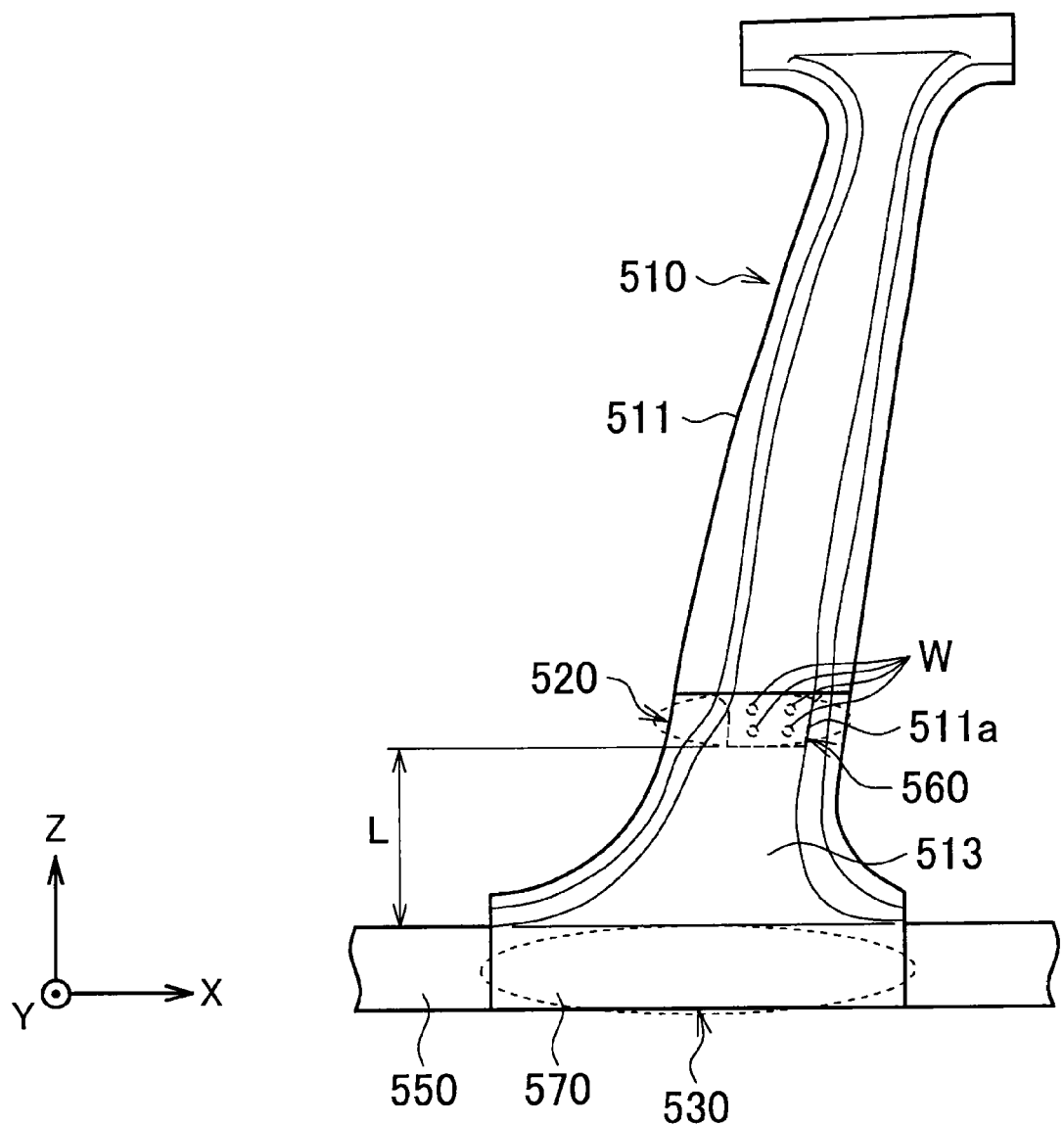
FIG. 13C is a side view of the vehicle body structure according to the fifth embodiment.

The fifth embodiment of the present invention will subsequently be described with reference to FIG. 13A, FIG. 13B, and FIG. 13C. FIG. 13A is a perspective view of an example of a vehicle body structure 500 according to the fifth embodiment. FIG. 13B is an end elevation view of the vehicle body structure 500 taken along in FIG. 13A. FIG. 13C is a side view of the vehicle body structure 500. As shown in FIG. 13A and FIG. 13C, the vehicle body structure 500 includes a frame member 510, a first support section 520, and a second support section 530.

The frame member 510 is a pillar member extending from a lower side to an upper side in the vertical direction (Z direction in FIG. 13A). The frame member 510 includes a first part 511 and a second part 513. As shown in FIG. 13A, the frame member 510 may bear a load F from the outside. The frame member 510 is arranged so that the second part 513 bears the load F. The load F is mainly input to a first top section 515a of the second part 513.

The first part 511 is an upper section of the frame member 510 in the vertical direction (Z direction in FIG. 13A). The second part 513 is a lower section continuously arranged below the first part 511 and is arranged between a vehicle body side member 550 and the first part 511.

The vehicle body structure 500 according to the fifth embodiment is, as shown in FIG. 13A, a side section structure of a vehicle body including a B-pillar corresponding to the frame member 510. In this case, the B-pillar is configured by the B-pillar upper member corresponding to the first part 511 and a B-pillar lower member corresponding to the second part 513.

The second part 513 of the frame member 510 has so-called a single-hat shape in a cross-section viewed from the widthwise direction of the frame member 510 (X-Y plane). That is, the second part 513 of the frame member 510 includes, as shown in FIG. 13B, a first member 515 having a substantially hat shape, and a second member 517 which is a sheet member partially bent. The first member 515 includes a first top section 515a corresponding to a top section, corner sections 515b, vertical wall sections 515c, and flange sections 515d. Further, the vertical wall sections 515c of the second part 513 of the frame member 510 are provided with softened layers 140.

The first support section 520 is formed by joining an upper end portion of the second part 513 with the first part 511. More specifically, the upper end portion of the second part 513 is overlapped and joined with a tongue piece portion 511a extending from the first part 511, at the welding portions W. That is, the frame member 510 includes a first high-strength part 560 where the tongue piece portion 511a and the upper side end portion of the second part 513 are overlapped and the bending strength is set to be higher than that of a part between the first support section 520 and the second support section 530.

The second support section 530 is formed by joining the lower end portion of the second part 513 with the side sill corresponding to the vehicle body side member 550. That is, the frame member 510 includes a second high strength part 570 where the vehicle side member 550 and the lower end portion of the second part are joined and the bending strength is set to be higher than that of the part between the first support section 520 and the second support section 530.

In this configuration, as shown in FIG. 13A, when the load F is input to the frame member 510 from the outside, the first high strength part 560 and the second high strength part 570 of the frame member 510 function as the first support section 520 and the second support section 530. As a result, when the bending deformation occurs in the frame member 510, the second part 513 deforms while being crushed between the first high strength part 560 and the second high strength part 570.

In the fifth embodiment, as shown in FIG. 13C, the L used in Expression (3) represents a length between the first high strength part 560 which is the first support section 520, and the second high strength part 570 which is the second support section 530.

According to the fifth embodiment, the vehicle body structure 500 has a proper arrangement condition of the members such as the frame member 510, and the frame member 510 includes a softened layer 140 having certain characteristics such as hardness and thickness. According to this configuration, in the vehicle body structure 500, the frame member 510 supported by a portion with a high bending strength can be deformed efficiently. Thus, it is possible to improve the load resistance while improving the deformation capability of the frame member 510. That is, in the vehicle body structure 500, it is possible to increase the energy absorption amount and further improve the impact absorption performance. Especially, even in a case in which the frame member 510 is formed from a high strength steel, it is possible to sufficiently deform each section of the frame member, thereby improving the deformation capability of the frame member 510.

The fifth embodiment suggests an example in which the softened layer 140 is provided between the first high strength part 560 and the second high strength part 570, but the present invention is not limited to this configuration. For example, a plurality of the high strength parts may be provided and the softened layer 140 may be provided between these high strength parts.

Further, the fifth embodiment suggests an example in which the first high strength part 560 and the second high strength part 570 have a strength higher than the other part, by overlapping and welding members, but the present invention is not limited to this configuration. For example, the high strength part may be provided by the thermal treatment technologies such as a partial quenching processing. Explanations of the vehicle body structure 500 according to the fifth embodiment of the present invention are as above.

EXAMPLES

Figure 14A:
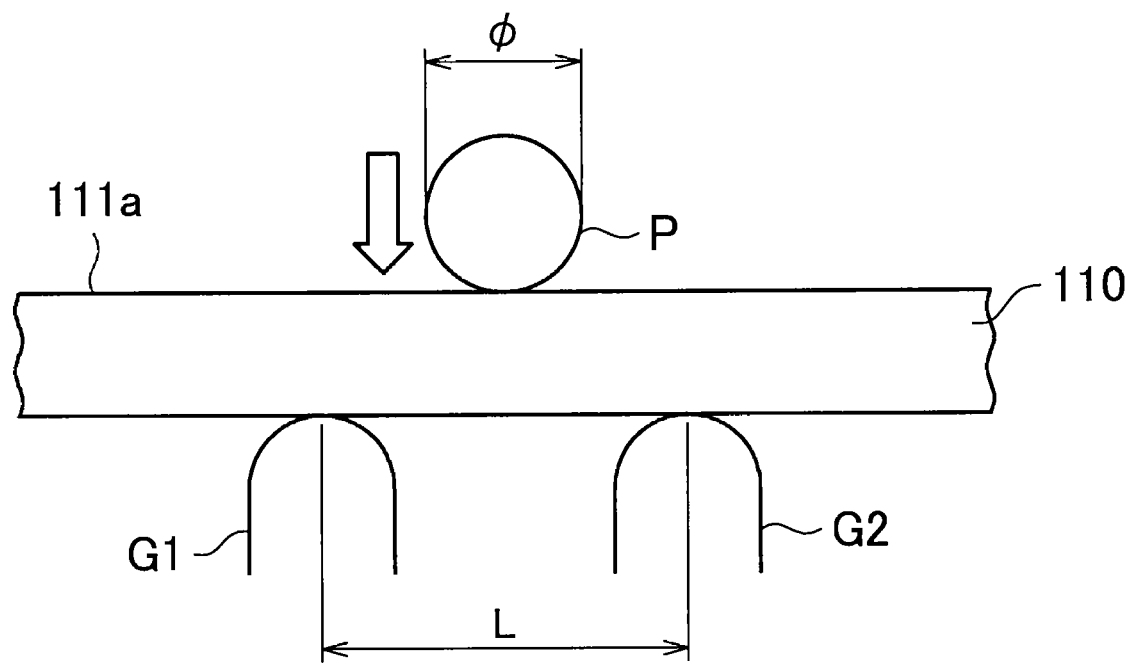
FIG. 14A shows conditions of the simulation.
Figure 14B:
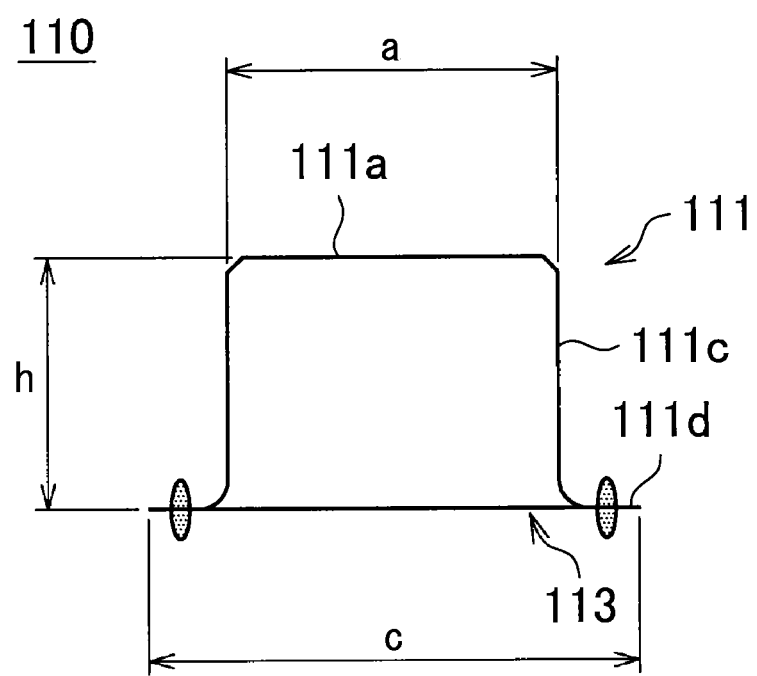
FIG. 14B shows conditions of the simulation.

Three-point bending test simulations were performed to evaluate the performance of the vehicle body structure 100 according to the present invention. The conditions for the simulations will be explained with reference to FIG. 14A and FIG. 14B. FIG. 14A and FIG. 14B are illustrations for explaining the conditions of the simulations. As shown in FIG. 14A, the diameter φ of the load-applying member P (pole) for the three-point bending test was set to be 150 mm, and the pole was moved toward the first top section 111a of the frame member 110 of the vehicle body structure 100 at a predetermined speed (see the arrow in the drawing). Two rigid supports G1 and G2 (corresponding to the first support section 120 and the second support section 130) were provided at a side of the second member 113 of the vehicle body structure 100; the span between the rigid supports G1 and G2 was defined as L. Then, simulations were performed in which the pole collides against the middle point of the two rigid supports G1 and G2. As shown in FIG. 14B, the length from the first top section 111a to the second member 113 was defined as h.

Regarding the other conditions of the analysis model, as shown in FIG. 14B, the sheet thickness was set to be 1.6 mm, the width a of the first top section 111a was set to be 80 mm, and the width c of the second member 113 was set to be 120 mm. Regarding the forming conditions, it was assumed that hot stamping process is applied to obtain a steel sheet member with a certain shape having 2.0 GPa class in tensile strength. Further, except for the Comparative Example 1, in some analysis models, a vertical wall section was provided with a softened layer. The ratio R/t, in terms of mm, was set to be 2.0 where the R represents the bending radius R of the corner section 111b and the t represents the sheet thickness of the corner section 111b of the frame member 110.

For each of the analysis models in which the value L and the value h are respectively changed, three-point bending test simulations were performed with the above conditions. Table 1 shows the results of the simulations.

The evaluation of Deformation Mode was performed based on the following criteria.
Poor: A frame member was locally deformed while being bent.
Good: A frame member was entirely deformed while being crushed.

The evaluation of Loading Characterization was performed based on the following criteria.
Poor: The load was dropped before reaching the elongation point at which the expected maximum load not considering a fracture mode is achieved.
Good: The expected maximum load not considering a fracture mode was achieved.

TABLE 1

| Sample | Formed position of the softened layer (mm) | Softened Layer | | | | | | | | Deformation Mode | Loading Characterization |
| | | Formed surface | Thickness | ΔHv1 | ΔHv2 | Surface hardness/ Central hardness | h | L | L/h | | |
|---|---|---|---|---|---|---|---|---|---|---|---|
| Example 1 | 51 | Both surfaces | 17% | 120 | 90 | 0.6 | 150 | 600 | 4.0 | Good | Good |
| Example 2 | 52 | Outer surface | 16% | 80 | 60 | 0.8 | 150 | 600 | 4.0 | Good | Good |
| Example 3 | Entire area of the corner section +55 | Both surfaces | 17% | 150 | 100 | 0.6 | 135 | 600 | 4.4 | Good | Good |
| Example 4 | Entire area of the vertical wall section | Both surfaces | 15% | 160 | 90 | 0.6 | 120 | 600 | 5.0 | Good | Good |
| Example 5 | 23 | Outer surface | 17% | 90 | 70 | 0.6 | 60 | 400 | 6.7 | Good | Good |
| Example 6 | Entire area of the frame member | Both surfaces | 14% | 120 | 100 | 0.7 | 105 | 600 | 5.7 | Good | Good |
| Comparative Example 1 | | None | | | | | 105 | 600 | 5.7 | Poor | Poor |
| Comparative Example 2 | 22 | Both surfaces | 17% | 120 | 90 | 0.6 | 60 | 600 | 10.0 | Poor | Poor |

TABLE 1-continued

| Sample | Formed position of the softened layer (mm) | Formed surface | Thickness | ΔHv1 | ΔHv2 | Surface hardness/ Central hardness | h | L | L/h | Deformation Mode | Loading Characterization |
|---|---|---|---|---|---|---|---|---|---|---|---|
| Comparative Example 3 | 30 | Both surfaces | 17% | 120 | 90 | 0.6 | 75 | 600 | 8.0 | Poor | Poor |
| Comparative Example 4 | 26 | Both surfaces | 17% | 120 | 90 | 0.6 | 40 | 600 | 15.0 | Poor | Poor |
| Comparative Example 5 | 23 | Both surfaces | 17% | 120 | 90 | 0.6 | 60 | 500 | 8.3 | Poor | Poor |
| Comparative Example 6 | 25 | Both surfaces | 1% | 150 | 140 | 0.5 | 60 | 400 | 6.7 | Poor | Poor |
| Comparative Example 7 | 45 | Both surfaces | 28% | 110 | 100 | 0.8 | 120 | 600 | 5.0 | Good | Poor |
| Comparative Example 8 | Entire area of the frame member | Both surfaces | 16% | 140 | 170 | 0.6 | 60 | 400 | 6.7 | Good | Poor |
| Comparative Example 9 | Entire area of the frame member | Both surfaces | 16% | 120 | 100 | 0.2 | 135 | 600 | 4.4 | Good | Poor |
| Comparative Example 10 | 55 | Both surfaces | 17% | 90 | 70 | 0.95 | 135 | 600 | 4.4 | Poor | Poor |
| Comparative Example 11 | 10 | Both surfaces | 12% | 110 | 80 | 0.7 | 60 | 300 | 5.0 | Poor | Poor |

In Table 1, the column of "Formed position of the softened layer" indicates values of the length d where the softened layer 140 was formed on the vertical wall section 111c from R-stop point A3. In Example 3, the description "Entire area of the corner section +55 mm" means that the softened layer 140 was formed on an entire area of the corner section 111b and on an area of the vertical wall section 111c with a length d of 55 mm from R-stop point A3 as shown in FIG. 3. In Example 4, the description "Entire area of the vertical wall section" means that, for example as shown in FIG. 2, the softened layer 140 was formed on an area of the vertical wall section 111c of the first member 111, from R-stop point at a side close to the corner section 111b to R-stop point at a side close to the flange section 111d. Further, in Example 6, Comparative Example 8, and the Comparative Example 9, the description "Entire area of the frame member" means that, for example as shown in FIG. 9, the softened layer 140 was formed on an entire area of the first member 111.

Further, in Table 1, "Both surfaces" in the column of "Formed surface" indicates that softened layers 140 were formed on the inner side and the outer side of the first member 111 in the closed cross-section of the frame member 110, and "Outer surface" indicates that a softened layer 140 was formed only on the outer side of the first member 111 in the closed cross-section of the frame member 110.

As shown in Table 1, in the Comparative Example 1, even though L/h≤6.7 was satisfied, the softened layer was not provided. Therefore, the deformation capability cannot be fully achieved, and thus Deformation Mode and Loading Characterization were evaluated as Poor. In addition, in the Comparative Examples 2 to 5, even though the softened layer was provided, L/h≤6.7 was not satisfied. Therefore, the deformation capability by the softened layer was not fully obtained. As a result, Deformation Mode was evaluated as Poor.

In the Comparative Example 6, even though L/h≤6.7 was satisfied, the thickness of the softened layer was 1% of the sheet thickness, that is, not satisfying a condition of equal to or more than 2% of the sheet thickness. Therefore, the deformation capability was not sufficient whereby the breakage occurred during the deformation. As a result, Deformation Mode and Loading Characterization were evaluated as Poor. In the Comparative Example 7, even though L/h≤6.7 was satisfied, the thickness of the softened layer was 28% of the sheet thickness, that is, not satisfying a condition of 20% or less of the sheet thickness. Therefore, the strength of the entire frame member deteriorated, and thus a sufficient load resistance was not obtained. As a result, Loading Characterization was evaluated as Poor.

In the Comparative Example 8, even though L/h≤6.7 was satisfied, the ΔHv2 of the softened layer was higher than ΔHv1. Therefore, the strength of the entire frame member deteriorated, and thus a sufficient load resistance was not obtained. As a result, Loading Characterization was evaluated as Poor.

In the Comparative Example 9, even though L/h≤6.7 was satisfied, the hardness of the softened layer on the surface was 0.2 times the hardness of the sheet-thickness-direction central section, that is, not satisfying a condition of "the hardness of the softened layer at the surface being greater than or equal to 0.5 times the hardness of the sheet-thickness-direction central section". Therefore, the strength of the entire frame member deteriorated, and thus a sufficient load resistance was not obtained. As a result, Loading Characterization was evaluated as Poor. In the Comparative Example 10, even though L/h≤6.7 was satisfied, the thickness of the softened layer on the surface was 0.95 times the hardness of the sheet-thickness-direction central section, that is, not satisfying a condition of "the hardness of the softened layer at the surface being smaller than or equal to 0.9 times the hardness of the sheet-thickness-direction central section". Therefore, the deformation capability was not fully achieved, whereby the breakage occurred and the maximum load was reached before completing the deformation. As a result, Deformation Mode and Loading Characterization were both evaluated as Poor.

In the Comparative Example 11, even though L/h≤6.7 was satisfied, the formed position of the softened layer was 10 mm from the bending stop of the corner section, that is, not satisfying a condition of "not less than ⅓ of h=60 mm". Therefore, the effect of improving the deformation capability was not fully achieved, whereby the breakage occurred and the maximum load was reached before completing the deformation. As a result, Deformation Mode and Loading Characterization were both evaluated as Poor.

On the other hand, In the Examples 1 to 6, as the softened layer 140 was provided and L/h≤6.7 was satisfied, the effect of improving the deformation capability by the softened layer 140 was sufficiently obtained. As a result, Deformation Mode and Loading Characterization were evaluated as Good.

Figure 15:
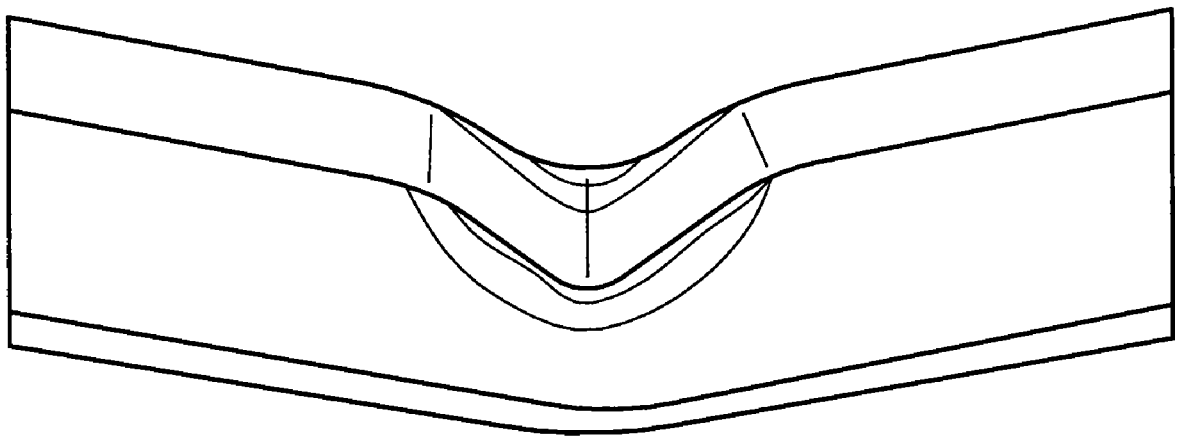
FIG. 15 shows a deformation manner in the analysis model obtained by the simulation.

The analysis model 1A shown in FIG. 15 corresponds to the Comparative Example 2 in Table 1. When the simulation was performed using the analysis model 1A, the frame member locally bent and deformed, as shown in FIG. 15. That is, as shown in Table 1, even though the frame member was provided with the softened layer, L/h≤6.7 was not satisfied, thus, there was a room for the frame member to improve the deformation capability.

Figure 16:
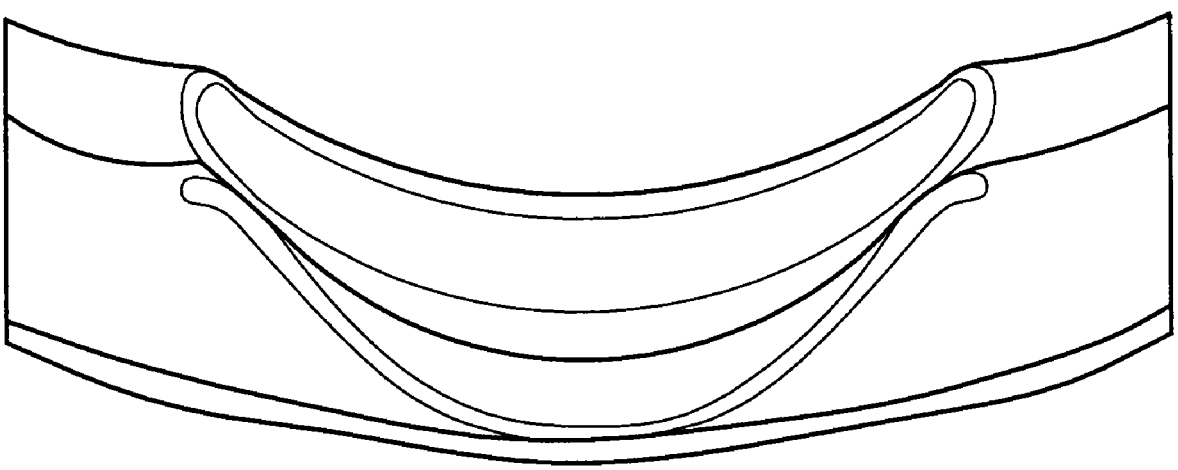
FIG. 16 shows a deformation manner in the analysis model obtained by the simulation.

On the other hand, FIG. 16 shows an example of deformation manner obtained by a result of the simulation using an analysis model of the frame member according to the present Example. The analysis model 1B shown in FIG. 16 corresponds to Example 5 in Table 1. As shown in FIG. 16A, in the analysis model satisfying L/h≤6.7 like Example 5, the frame member entirely deformed while being crushed.

Figure 17:
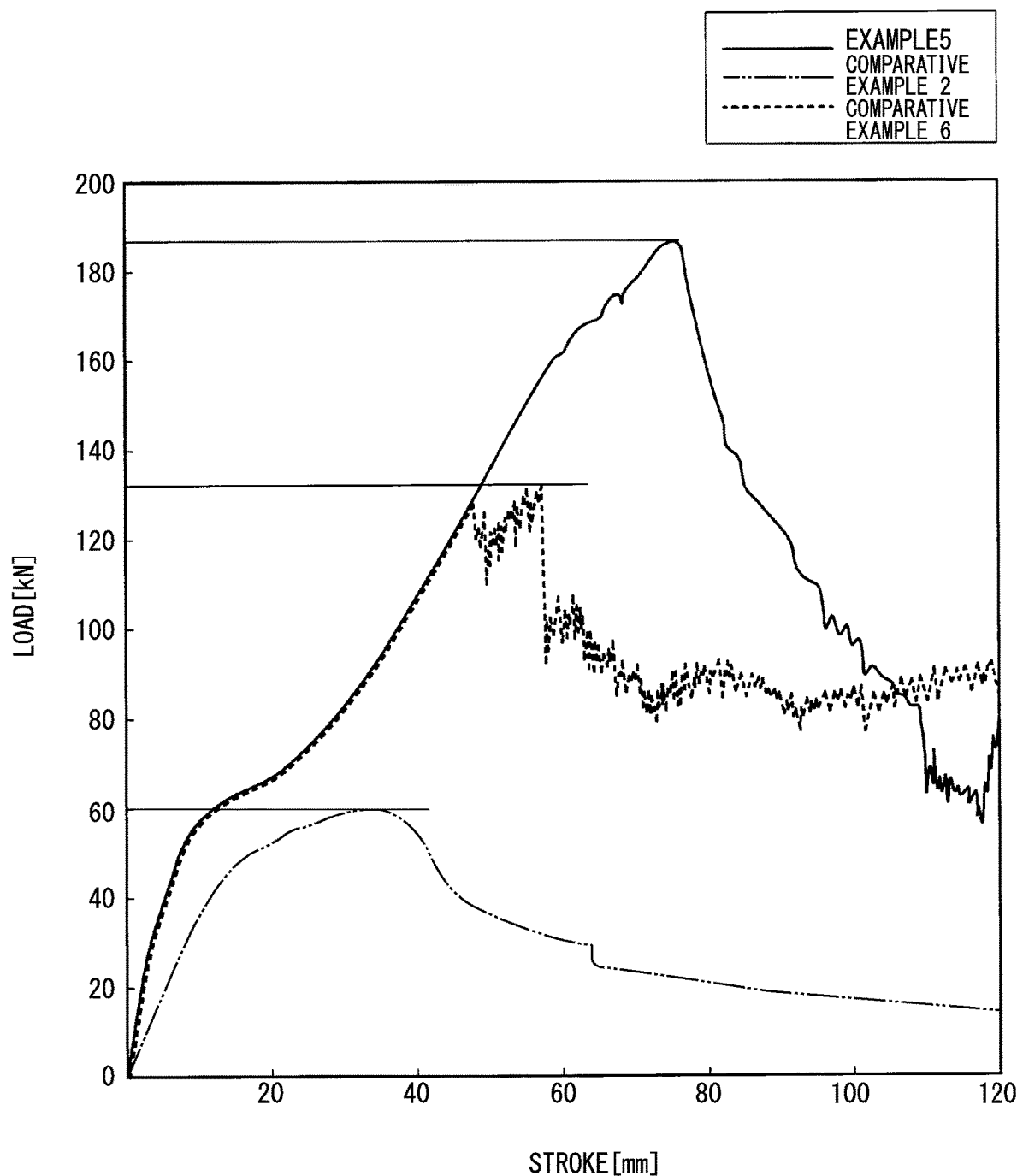
FIG. 17 is a graph representing a relationship between a load and a stroke obtained by the simulations.

Further, FIG. 17 shows examples of the load-stroke diagram obtained by the simulations using Example 5, Comparative Example 2, and Comparative Example 6. In Example 5 and Comparative Example 2 each having a softened layer of the present embodiment, the bending angle $\alpha_c$ [deg], which is the threshold value for the fracture determination, was 53°, and in the Comparative Example 6 not having a softened layer of the present embodiment, the bending angle $\alpha_c$ [deg], which is the threshold value for the fracture determination, was 39°. The bending angle $\alpha_c$ [deg] is an angle converted from a displacement at the time of reaching the maximum load obtained by the bending test in conformity with the VDA standard (VDA238-100) specified by Verband der Automobilindustrie; the angle is obtained by converting the displacement into an angle based on VDA standard.

As shown in FIG. 17, in the load-stroke diagram, Comparative Example 2 including the softened layer but not satisfying L/h≤6.7, the fracture occurred at the stroke of 68 mm and thus the maximum load was only 60 kN. Therefore, the energy absorption amount at the time of reaching the stroke of 60 mm was 2.57 kJ.

In Comparative Example 6, which satisfied L/h≤6.7 but did not include the softened layer, it was possible to achieve the maximum load of 130 kN, but the fracture occurred at the time of reaching the stroke of 48 mm. Thus, the energy absorption amount at the time of reaching the stroke of 120 mm was 10.29 kJ.

Unlike the above Comparative Example 2 and the Comparative Example 6, Example 5 included a softened layer and satisfied L/h≤6.7. In this Example 5, it was possible to achieve the maximum load of 185 kN, and the fracture did not occur even at the bending angle $\alpha_c$=53°. Thus, the energy absorption amount at the time of reaching the stroke of 120 mm was 12.82 kJ. As shown above, in Example 5 having a softened layer 140, it was possible to improve the load resistance and the deformation capability, and as a result, the energy absorption amount was increased. That is, it was demonstrated that, in the vehicle body structure 100, if the frame member 110 is provided with a softened layer 140 and the vehicle body structure 100 satisfies L/h≤6.7, it is possible to improve the load resistance and increase the energy absorption amount in the vehicle body structure 100.

Preferable embodiments of the present invention have been described above with reference to the accompanying drawings, but the present invention is not limited thereto. It is apparent that a person who has typical knowledge in the technical field to which the present invention belongs can realize a variety of changes or modifications within the technical idea category set in the present application, and it is understood that the changes or modifications also naturally belong to the technical scope of the present invention.

For example, in the above embodiment, the first member 111 is a substantially hat shape member, but the present invention is not limited to this example. The first member 111 may have a shape for forming a vehicle body structure, and thus may have a cross-section with a substantially U shape or arc shape. Further, the first member may have a cross-section in which a part of the member is bent, or may be provided with a bead having a concave or convex shape.

Further, in the above embodiments, in addition to the first member 111 and the second member 113, a member configuring an outline of the frame member 110 may be provided. Further, between the first member 111 and the second member 113, another member may be provided. Further, a cover member may be provided so as to cover the first member 111 and the second member 113 from the outside.

INDUSTRIAL APPLICABILITY

According to the present invention, it is possible to provide a vehicle body structure in which deformation capability and load resistance at the time of crushing are both improved.

BRIEF DESCRIPTION OF THE REFERENCE SYMBOLS 100, 200, 300, 400, 500 Vehicle body structure
110, 210, 310, 410, 510 Frame member
111a, 211a, 311a, 411a, 515a First top section
111b, 211b, 311b, 411b, 515b Corner section
111c, 211c, 311c, 411c, 515c Vertical wall section
120, 320, 420, 520 First support section
130, 330, 430, 530 Second support section
140 Softened layer
141 First hardness changing area
142 Second hardness changing area
150 Sheet-thickness-direction central section
160, 170, 360, 370, 460, 470 Cross member

What is claimed is:
1. A vehicle body structure comprising
a frame member which includes
a first top section,
a corner section provided at an end portion of the first top section,
a wall section extending from an end portion of the corner section, and
a second top section which is opposed to the first top section, and
a first support section and a second support section which are provided on the second top section, wherein
L/h≤6.7 is satisfied, where h represents a length between an outer surface of the first top section and an outer surface of the second top section, and L represents a length between the first support section and the second support section,
the wall section is provided with a softened layer, in the wall section, the softened layer is provided on an area extending from a bending stop of the corner section toward the widthwise direction of the wall section by a length of h/3, hardness of a sheet-thickness-direction central section in a portion where the softened layer is provided is greater than or equal to 400 Hv, and the softened layer is an area having hardness smaller by at least 10 Hv than the hardness of the sheet-thickness-direction central section in the portion where the softened layer is provided, a thickness of the softened layer is greater than or equal to 2% of the sheet thickness in the portion where the softened layer is provided but smaller than 20% of the sheet thickness in the portion where the softened layer is provided, the hardness of the softened layer at the surface is greater than or equal to 0.5 times the hardness of the sheet-thickness-direction central section in the portion where the softened layer is provided but smaller than 0.9 times the hardness of the sheet-thickness-direction central section in the portion where the softened layer is provided, the softened layer has a first hardness changing area that is an area extending from the surface to 40% of the thickness of the softened layer in the sheet thickness direction and a second hardness changing area that is an area different from the first hardness changing area out of the softened layer, an absolute value $\Delta Hv1$ of a change in hardness of the first hardness changing area in the sheet thickness direction is greater than an absolute value $\Delta Hv2$ of a change in hardness of the second hardness changing area in the sheet thickness direction.

2. The vehicle body structure according to claim 1, wherein the softened layer is provided on a surface continuing to a surface of an outer bending side of the corner section in the wall section.

3. The vehicle body structure according to claim 1, wherein the softened layers are provided on a surface continuing to an inner bending side surface of the corner section and a surface continuing to a surface of an outer bending side of the corner section in the wall section.

4. The vehicle body structure according to claim 1, wherein the softened layer is provided on at least one of an inner bending side surface and a surface of an outer bending side of the corner section toward the sheet thickness direction.

5. The vehicle body structure according to claim 1, wherein in the first top section, the softened layer is provided on an area extending from the corner section by a length not less than ½ of the first top section in the widthwise direction.

6. The vehicle body structure according to claim 1, wherein in the second top section of the frame member, the first support section or the second support section is formed by attaching a cross member to the frame member in a direction substantially orthogonal to the longitudinal direction of the frame member.

7. The vehicle body structure according to claim 1, wherein the first support section or the second support section is formed by setting a bending strength of the first support section or the second support section to be higher than a bending strength of a part of the frame member between the first support section and the second support section.

* * * * *